United States Patent [19]

Nakayama et al.

[11] Patent Number: 4,974,008
[45] Date of Patent: Nov. 27, 1990

[54] FOCUS DETECTING SYSTEM

[75] Inventors: Toshiki Nakayama, Tatsunomachi; Junichi Nakamura, Ina; Masafumi Yamazaki, Hachioji, all of Japan

[73] Assignee: Olympus Optical Co., Ltd., Tokyo, Japan

[21] Appl. No.: 503,090

[22] Filed: Mar. 30, 1990

Related U.S. Application Data

[63] Continuation of Ser. No. 260,421, Oct. 20, 1988, abandoned.

[30] Foreign Application Priority Data

Oct. 21, 1987 [JP] Japan ................................ 62-263746
Oct. 21, 1987 [JP] Japan ................................ 62-263747

[51] Int. Cl.$^5$ ............................................. G03B 13/36
[52] U.S. Cl. .................................................. 354/402
[58] Field of Search ......................... 354/400, 402, 408

[56] References Cited

U.S. PATENT DOCUMENTS 4,752,831 6/1988 Biber et al. ........................... 354/400

Primary Examiner—Russell E. Adams
Attorney, Agent, or Firm—Armstrong, Nikaido, Marmelstein, Kubovcik & Murray

[57] ABSTRACT

A focus detecting system is provided with a non-destructive type photoelectric conversion element array, an A/D converter for converting the analog output of the photoelectric conversion element array into a corresponding digital value, and a focus-detecting arithmetic circuit for performing arithmetic operations upon the distance to an object on the basis of the digital value output from the A/D converter. In the focus detecting system, when a predetermined initial integration period elapses after the storage of the electric charge has been started, a sequence of in-focus-state detecting operations comprising the steps of effecting non-destructive readout of the output of the photoelectric conversion element array, performing A/D conversion of the readout output and performing arithmetic operations for focus detection is repeatedly executed so that focus detection is effected. With this arrangement, the integration period required for a focus detecting operation can be rationally made as short as possible in accordance with the states of an object, such as brightness and contrast.

10 Claims, 16 Drawing Sheets

FOCUS DETECTING SYSTEM

This application is a continuation of application Ser. No. 260,421 filed Oct. 20, 1988, now abandoned.

BACKGROUND OF THE INVENTION

1. Field of the Invention

This invention relates to a focus detecting system which enables the integration period required for a focus detecting operation to be made as short as possible by means of a photosensor device constituted by photoelectric conversion elements, such as static induction transistors (hereinafter referred to simply as "SIT(s)"), from which stored photoelectric charges can be read out non-destructively.

2 Description of the Related Art

In general, when focus detection is to be performed by means of an automatic focus control apparatus incorporated in a camera or the like, it is necessary to obtain signals corresponding to the contrast of an object. However, if the signal level is too small, problems such as the influences of noise or a quantizing error due to A/D conversion become serious. On the other hand, if the signal level is so large as to exceed the dynamic range of A/D conversion, it will be impossible to obtain correct detection signals. Accordingly, in order to effect focus detection with accuracy, it is necessary to control the integration period required for a focus detecting operation so that output signals of optimum magnitude can be obtained from a photosensor device irrespective of the intensity of the brightness of an object.

However, if these problems are to be solved, various other problems will occur in focus detecting apparatus of the conventional type employing a photoelectric conversion device such as a CCD (charge-coupled device) as a photosensor device. Such a focus detecting apparatus adopts a destructive readout method in which once a stored signal is read out for the purpose of confirming the level of an output signal, the corresponding stored photoelectric charge is lost. It is, therefore, impossible to control the integration period directly on the basis of the output signal level of the photoelectric conversion device.

To overcome this problem, in Japanese Patent Laid-open No. 64,711/1982, U.S. Pat. No. 4,410,258, British Patent No. 2,082,010, West German Patent No. 3,131,053 and so forth, it has been proposed to provide an image sensor in which a separate photoelectric conversion device such as a photodiode for monitoring the quantity of light is arranged in the vicinity of a focus-detecting photoelectric conversion element array such as an CCD or the like so that the integration period of the photoelectric conversion element array can be controlled by undirectly inferring the signal output level of the focus-detecting photoelectric conversion element array on the basis of the output level of the monitoring photoelectric conversion device.

Furthermore, Japanese Patent Laid-open No. 140,409/1984 proposes a method in which if an object is of low brightness, focus detection is performed by amplifying a photosensor output to apparently increase its integration period. In this focus detecting system, if an object is of such low brightness that an integration operation for providing signals required for focus detection is not completed within a predetermined period, with the result that the amount of charge stored is less than a predetermined value, the photosensor output signal is amplified at an amplification ratio not smaller than 1 to thereby enable focus detection. In this fashion, this conventional method intends to prevent deterioration in response by restricting the integration period to not longer than a predetermined time period, as well as to prevent deterioration in detection accuracy by amplifying the photosensor output signal.

In addition, Japanese Patent Laid-open No. 26,016/1986 discloses the following focus detecting method. Specifically, if an object is of low brightness, the integration operation is stopped when the elapsed time of the integration period reaches a predetermined period $T_1$ and the amplification ratio of a photosensor output signal is determined from the output level of a monitoring photoelectric conversion device that was provided at the time that the integration was stopped. Based on the output signal thus amplified, focus determination is performed once. If, in this focus determination, no in-focus state is obtained and it is determined that focus detection is impossible, the integration period is extended to $T_2$ ($>T_1$) and integration is carried out again.

However, in the above-described conventional focus detecting apparatus which is arranged so that the integration period is determined, for convenience' sake, on the basis of whether the output of the monitoring photoelectric conversion device, which is separately disposed in the vicinity of the photoelectric conversion device such as a CCD, has reached a predetermined reference value, it is not deemed that an integration period of rational length can be determined according to the state of each individual object. For instance, even in the case of an object which has low brightness but contrast high enough to enable focus detection thereof, this focus detecting apparatus continues integration until the output of the monitoring photoelectric conversion device reaches the predetermined value. As a result, a time period longer than it would originally take is consumed until an in-focus state is detected.

If the brightness of an object is high, this disadvantage does not provide any serious influence over the total period required for a focus detecting operation, since the integration period is originally short in the case of focus detection as to a high-brightness subject. However, if an object has such low brightness that a long integration period is required, such disadvantage becomes serious, so that blurring and deterioration in response may be caused.

Furthermore, the conventional focus detecting system, which is arranged to amplify its photosensor output when an object is of low brightness, involves the non-rationality that the amplification ratio of the photosensor output level must be determined according to the monitor output level rather than the photosensor output level itself. In addition, in the focus detecting method disclosed in the above Japanese Patent Laid-open No. 26,016/1986, once the amplification ratio of the photosensor output signal is determined on the basis of the monitor output level which was reached after the passage of a predetermined integration period, the photosensor output signal is amplified at this amplification ratio. If no in-focus state is detected with the output signal thus amplified, the integration period is extended and integration is again performed. This repetition of integration requires a time-consuming and complicated operation.

SUMMARY OF THE INVENTION

It is, therefore, an object of the present invention to provide a focus detecting system which is capable of solving the above-described problems experienced in conventional focus detecting systems.

It is another object of the present invention to provide a focus detecting system which enables the integration period required for a focus detecting operation to be made as short as possible in accordance with the state of each individual object.

It is still another object of the present invention to provide a focus detecting system which uses non-destructive type of photoelectric conversion device as a photosensor device to effect non-destructive readout of the photoelectric conversion device, thereby repeatedly executing a focus detecting operation.

To achieve the above and other objects, in a first aspect of the present invention, there is provided a focus detecting system which includes a non-destructive type photoelectric conversion element array constituted by a plurality of photoelectric conversion elements each of which allows an output corresponding to the photoelectric charge stored therein to be read out without destroying the stored photoelectric charge; A/D conversion device for converting the analog output of the photoelectric conversion element array into a corresponding digital value; and focus-detecting arithmetic device for performing arithmetic operations upon the distance to an object on the basis, of the digital value output from the A/D conversion device. In this focus detecting system, when a predetermined initial integration period $T_0$ ($T_0 \geq 0$) elapses after the storage of the photoelectric charge has been started, a sequence of in-focus-state detecting operations comprising the steps of effecting non-destructive readout of the output of the photoelectric conversion element array, performing A/D conversion of the readout output and performing arithmetic operations for focus detection is repeatedly executed so that focus detection is effected.

Since focus detection is performed in this manner, the sequence of operations comprising the steps of performing non-destructive readout of signals corresponding to the photoelectric charges which have been stored continuously until the time of readout of the individual signals, effecting A/D conversion of the signal thus read, and executing arithmetic operations for focus detection on the basis of the digital signal obtained by the A/D conversion step are repeated until a focus detecting operation is completed. Therefore, since no monitoring photoelectric conversion device is needed, the integration period required for a focus detecting operation can be rationally made as short as possible according to the states of a subject, such as brightness, contrast, etc.

In a second aspect of the present invention, there is provided a focus detecting system which includes a non-destructive type photoelectric conversion element array constituted by a plurality of photoelectric conversion elements each of which allows an output corresponding to the photoelectric charge stored therein to be read out without destroying the stored photoelectric charge; variable amplification device for amplifying the analog output of the photoelectric conversion element array in accordance with the level of the output; A/D conversion device for converting the analog output of the variable amplification device into a corresponding digital value; and focus-detecting arithmetic device for performing arithmetic operations upon the distance to an object on the basis of the digital value output from the A/D conversion device. In this focus detecting system, when a predetermined initial integration period $T_0$ ($T_0 \geq 0$) elapses after the storage of the photoelectric charge has been started, a sequence of in-focus-state detecting operations comprising the steps of effecting non-destructive readout of the output of the photoelectric conversion element array, performing A/D conversion of the output which is not amplified, and performing arithmetic operations for focus detection is repeatedly executed so that focus detection is effected. On the other hand, if an object is of low brightness and no in-focus state is detected even after a predetermined integration period $T_1$ ($T_1 > T_0$) has elapsed, the output of the photoelectric conversion element array is amplified in accordance with the level of the output and the sequence of in-focus-state detecting operations is repeatedly executed so that focus detection is effected.

Since focus detection is performed in this manner, if no in-focus state is detected, because of the low brightness of an object, even after the predetermined integration period $T_1$ has elapsed, the output of the photoelectric conversion element array is amplified at an amplification ratio according to the level of the output, and the above sequence of in-focus-state detecting operations is repeatedly executed. It is, therefore, possible to prevent a waste of time due to the repetition of integration which has been unavoidable in conventional focus detecting systems. In addition, since the amplification ratio is determined on the basis of the output of the photoelectric conversion element array itself, the amplification ratio can be determined rationally.

In a third aspect of the present invention, there is provided a focus detecting system which includes a non-destructive type photoelectric conversion element array constituted by a plurality of photoelectric conversion elements each of which allows an output corresponding to the photoelectric charge stored therein to be read out without destroying the stored photoelectric charge; monitoring device for monitoring the amount of charge stored in the photoelectric conversion element array; comparing device for comparing the output of the monitoring device with a reference value; A/D conversion device for converting the analog output of the photoelectric conversion element array into a corresponding digital value; and focus-detecting arithmetic device for performing arithmetic operations upon the distance to an object on the basis of the digital value output from the A/D conversion device. In this focus detecting system, when the monitor output level of the monitoring device reaches a predetermined value, which allows detection of an in-focus state, before a predetermined period elapses after the storage of the photoelectric charge has been started, the output of the photoelectric conversion element array is read out so that focus detection is effected. On the other hand, if the monitor output level does not reach the predetermined value within the predetermined period, a sequence of in-focus-state detecting operations comprising the steps of performing non-destructive readout of the output of the non-destructive conversion element, effecting A/D conversion of the readout output and performing arithmetic operations for focus detection is repeatedly executed so that focus detection is effected.

Since focus detection is performed in this fashion, if an object is of high brightness, the monitor output reaches the predetermined value in a short time and therefore the integration period required for the readout of the photoelectric conversion element array is shortened, so that a rapid focus detecting operation is achieved. On the other hand, if the brightness of an object is so low that the monitor output does not reach the predetermined value even after the passage of the predetermined time period, the sequence of in-focus-state detecting operations comprising the steps of performing non-destructive readout of the output of the non-destructive conversion element, effecting A/D conversion of the readout output and performing arithmetic operations for focus detection is repeatedly executed until an in-focus state is detected. Accordingly, the integration period required for a focus detecting operation can be rationally made as short as possible according to the state of an object, such as brightness, contrast, etc.

The above and other objects, features and advantages of the present invention will become apparent from the following description of the preferred embodiments thereof, taken in conjunction with the accompanying drawings.

DESCRIPTION OF THE PREFERRED EMBODIMENTS

Preferred embodiments of the present invention will be described in detail below with reference to the accompanying drawings.

Figure 1:
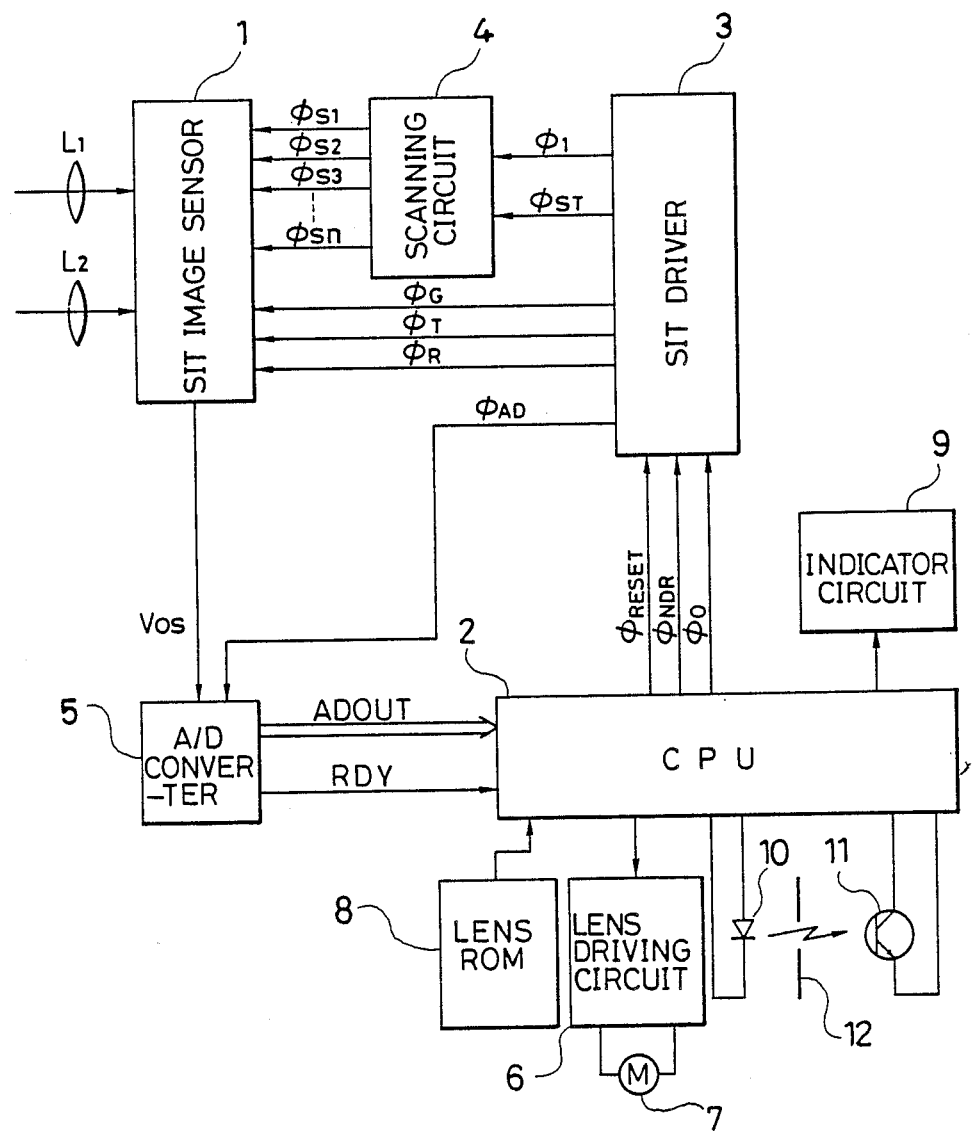
FIG. 1 is a block diagram showing a first embodiment of a focus detecting system according to the present invention.

FIG. 1 is a block diagram of a first embodiment of a focus detecting system according to the present invention. As illustrated, an SIT image sensor 1, which is provided with a line sensor composed of a plurality of SIT picture element, is arranged such that light rays transmitted through a pair of lenses $L_1$ and $L_2$ are incident upon the corresponding SIT element array. In the following explanation of this embodiment, an example which uses a focus detecting system of the split-pupil type will be referred to by way of example. If a focus detecting system of the sharpness detecting type is used, neither of the lenses $L_1$ and $L_2$ is needed. A CPU 2 is arranged to supply an SIT driver 3 with a basic clock pulse $\phi_O$ for driving the SIT image sensor 1, a signal $\phi_{NDR}$ for commanding the start of a non-destructive readout, and a reset signal $\phi_{RESET}$ for resetting the photoelectric charges stored in the SITs which constitute the picture elements of the line sensor, source lines, and readout transistors.

In response to a control signal supplied from the CPU 2, the SIT driver circuit 3 supplies the SIT image sensor 1 with a gate input signal $\phi_G$, a transfer pulse $\phi_T$ and a readout line reset pulse $\phi_R$ which correspond to a readout operation, a charge storing operation and a stored-charge resetting operation, respectively. All of them serve as drive signals for the SIT image sensor 1. The SIT driver circuit 3 is adapted to supply a scanning circuit 4 with a clock pulse $\phi_1$ for driving the scanning circuit 4 and a scanning start pulse $\phi_{ST}$ both of which serve to drive the scanning circuit 4. The scanning circuit 4 supplies pulses $\phi_{S1}, \phi_{S2}, \ldots, \phi_{Sn}$ to the SIT image sensor 1 so as to sequentially select the output lines thereof.

The SIT image sensor 1 supplies an A/D converter 5 with the output signal $V_{OS}$ of its output circuit that corresponds to the charge stored in each of the picture-element SITs of the SIT image sensor 1. Also, the aforesaid SIT driver circuit 3 is adapted to supply the A/D converter 5 with a signal $\phi_{AD}$ which informs the A/D converter 5 of the timing of A/D conversion. The A/D converter 5 is adapted to supply the CPU 2 with a digital signal ADOUT obtained by digitizing the output signal $V_{OS}$ of the output circuit of the SIT image sensor 1, as well as a signal RDY which informs the CPU 2 of the end of a A/D conversion process.

A lens driving circuit 6 is a circuit for activating a motor 7 in accordance with the object-distance information obtained by arithmetic operations performed by the CPU 2 to thereby drive a lens (not shown). A lens ROM 8, which is incorporated in the lens barrel of the lens, has the data stored beforehand required for focus detection, such as the f number of the lens and conversion factors used for calculating the amount of defocusing from the amount of discrepancy between object images formed on the aforesaid SIT picture element array. An indicator device 9 is a device for providing an indication of whether the lens is in focus or out of focus.

When the distance to an object is detected and a photographing lens is to be driven on the basis of the result of the detection, it is normally necessary to feed the amount of travel of the lens back to the CPU 2.

However, it is common practice to substitute the number of rotations of the lens driving motor 7 for the amount of lens travel and, in the present embodiment, a light emitting diode 10 and a phototransistor 11 are used for the purpose of detecting the number of rotations. More specifically, when the lens driving circuit 6 is activated and the motor 7 is operated, slits 12, which are spaced equally apart around the rotating member of the lens barrel, are rotated and the number of the slits 12 is counted by a photointerruptor composed of the light emitting diode 10 and the phototransistor 11 which are opposed to each other so as to sandwich the passage way of the slits 12, so that the number of rotations of the lens driving motor 7 is detected. The CPU 2 stores the count of the slits 12 in its memory and is adapted to stop the operation of the motor 7 when the count has reached a predetermined value.

The constructions of the SIT image sensor 1 having the line sensor composed of the picture-element SITs, as well as a readout circuit associated therewith will be described below with reference to FIGS. 2 and 3.

Figure 2:
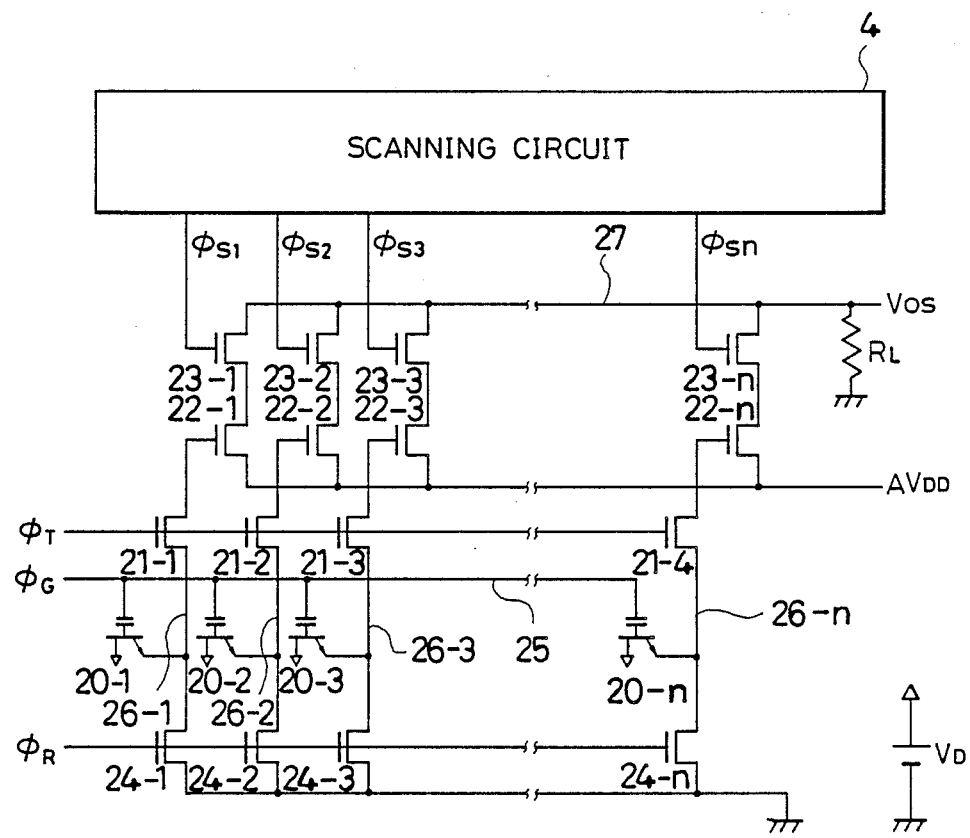
FIG. 2 is a circuit diagram showing the SIT image sensor in FIG. 1 and its associated readout circuit.
Figure 3:
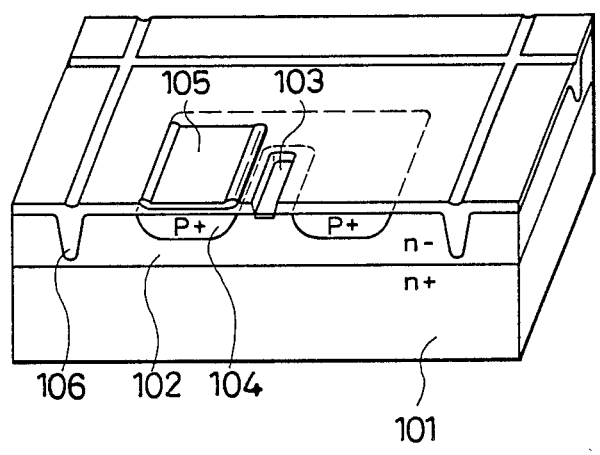
FIG. 3 is a schematic perspective view showing in partial cross section the structure of one of the SITs used in the present invention.

In FIG. 2, the picture-element SITs which constitute the line sensor are represented by numerals 20-1, ..., 20-n, and each of the picture elements has the construction shown in FIG. 3. As shown in FIG. 3, reference numeral 101 denotes an silicon substrate which serves as the drain of the SIT n+ silicon substrate which serves as the drain of the SIT picture element, and an n− epitaxial layer 102 is deposited over the n+ silicon substrate 101 to form a channel region. A shallow n+ source region 103 is formed in the n− epitaxial layer 102, and the n+ source region 103 is surrounded by a p+ gate region 104 in the area occupied by the n− epitaxial layer 102. A MOS capacitor 105 is formed on the p+ gate region 104, and pulses are supplied through the MOS capacitor 105. When the p+ gate region 104 is reverse-biased, a depletion layer is formed outside the p+ gate region 104. When light is incident upon the depletion layer and hole-electron pairs are generated, the electrons are swept into the n+ source region 103 and the n+ drain region 101, and the holes are stored in the p+ gate region 104. In consequence, the gate potential increases and the current between the n+ drain region 101 and the n+ source region 103 is modulated by such variations in the gate potential, with the result that a signal which has been amplified in accordance with the intensity of the incident light is obtained. In FIG. 3, reference numeral 106 denotes a separation region for separating the picture elements from one another.

Since the SIT constructed in this manner is used as individual picture elements of the line sensor, it is possible to perform storage of photoelectric charges, readout of signals corresponding to stored photoelectric charges, and resetting of the stored photoelectric charges by means of voltages which are applied to the gates of the respective SITs through the capacitors formed on their gate portions.

Referring back to FIG. 2, the gates of the respective picture-element SITs 20-1, 20-2, ..., 20-n are connected to a gate line 25 through the corresponding capacitors, so that the gate input signal $\phi_G$ is applied to each of the gates. The sources of the respective picture-element SITs 20-1, 20-2, ..., 20-n are respectively connected to the gates of readout transistors 22-1, 22-2, ..., 22-n through both source lines 26-1, 26-2, ..., 26-n and transfer switches 21-1, 21-2, ..., 21-n which are constituted by MOS transistors. The drains of the respective picture-element SITs 20-1, 20-2, ..., 20-n are connected in common to an electrical power source $V_D$. The drains of the respective reset transistors 24-1, 24-1, ..., 24-n are connected to the source lines 26-1, 26-2, ..., 26-n, respectively. The transfer pulse $\phi_T$ is applied to the gates of the respective MOS transistors which constitute the transfer switches 21-1, 21-2, ..., 21-n. Upon completion of an integration process, the transfer switches 21-1, 21-2, ..., 21-n are switched on, the source potentials of the picture-element SITs 20-1, 20-2, ..., 20-n are transferred to the gates of the readout transistors 22-1, 22-2, ..., 22-n, respectively. When the source lines 26-1, 26-2, ..., 26-n are reset, the transfer switches 21-1, 21-2, ..., 21-n are switched on and the gates of the readout transistors 22-1, 22-2, ..., 22-n are reset through the reset transistors 24-1, 24-2, ..., 24-n, respectively. The sources of the reset transistors 24-1, 24-2, ..., 24-n are grounded and the reset pulse $\phi_R$ applied to their gates.

The drains of the readout transistors 22-1, 22-2, ..., 22-n are connected to an electrical power source $AV_{DD}$, and the sources of the readout transistors 22-1, 22-2, ..., 22-n are connected to a load resistor $R_L$ through corresponding picture-element selecting switches 23-1, 23-2, ..., 23-n and a picture-element-output readout line 27, so that a source follower circuit may be formed between each of the readout transistors 22-1, 22-2, ..., 22-n and the load resistor $R_L$. The gates of the picture-element selecting switches 23-1, 23-2, ..., 23-n are connected to the scanning circuit 4, and scanning pulses $\phi_{S1}, \phi_{S2}, \ldots, \phi_{Sn}$ are applied to the gates of the picture-element selecting switches 23-1, 23-2, ..., 23-n, respectively, for the purpose of executing a selecting operation.

Next, the operation of the focus detecting system shown in FIGS. 1 and 2 will be described below with reference to FIG. 4, which is a waveform diagram illustrating the timing of each of the above-described signals.

Figure 4:
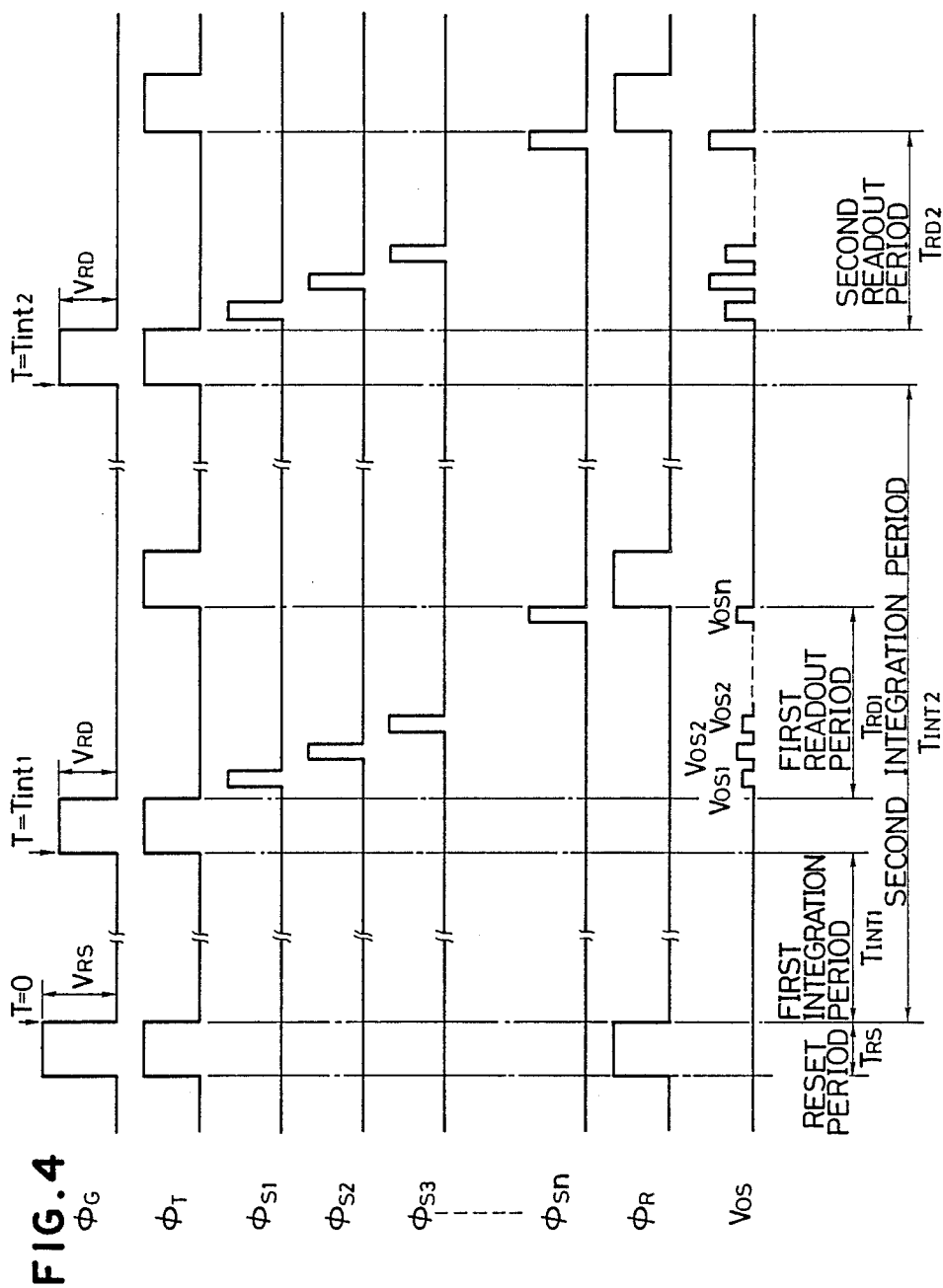
FIG. 4 is a signal waveform diagram which serves to illustrate the operation of the first embodiment.

During the reset period $T_{RS}$ shown in FIG. 4, when the gate input signal $\phi_G$ goes to its reset level $V_{RS}$ ($V_{RS} > \phi_B$: $\phi_B$ is the built-in voltage between the gate and the source) and the reset pulse $\phi_R$ and the transfer pulse $\phi_T$ go to their high levels, the source potential $V_S$ of each of the picture element SITs 20-1, 20-2, ..., 20-n is reset to ground potential and its gate potential $V_G$ goes to the level $\phi_B$.

When a first integration period $T_{INT1}$, a second integration period $T_{INT2}$ or a subsequent arbitrary integration period is started after the completion of the reset period $T_{RS}$, the gate input signal $\phi_G$, the reset pulse $\phi_R$, and the transfer pulse $\phi_T$ go to the level of the ground potential. At this time, the gate potential $V_G$ is set to the reverse-biased state represented by the following equation (1), and light integration in each of the picture element SITs is started.

$$V_G = -\frac{C_G}{C_G + C_J} \cdot V_{RS} + \phi_B \quad (1)$$

where $C_G$: capacitance of the gate capacitor of the SIT, $C_J = C_{GS} + C_{GD}$, $C_{GS}$: parasitic capacitance between the gate and source of the SIT, and $C_{GD}$: parasitic capacitance between the gate and drain of the SIT.

The charge $Q_{Ph}(T_{INT1})$ generated by illumination with light during the first light integration period $T_{INT1}$ is stored in the gate capacitor ($C_G+C_J$) as represented by the following equation (2):

$$Q_{Ph}(T_{INT1}) = G_L \cdot A \cdot P \cdot T_{INT1} = G_L \cdot A \cdot E \quad (2)$$

where $G_L$ represents the generation ratio ($\mu A/\mu W$), A represents the surface area of a light receiving surface (cm$^2$), P represents the irradiance of light($\mu W/cm^2$), $T_{INT1}$ represents the integration period (sec.), and E represents the amount of exposure ($E = P \cdot T_{INT1}$).

From equations (1) and (2), the gate voltage $V_G$ is represented by the following equation (3):

$$V_G = -\frac{C_G}{C_G + C_J} \cdot V_{RS} + \phi_B + \frac{Q_{Ph}(T_{INT1})}{C_G + C_J} \quad (3)$$

At the time $T_{int1}$ the first integration period $T_{INT1}$ is ended, and next when a first readout period $T_{RD1}$ during which readout of the picture element SITs is performed, is started, the gate input signal $\phi_G$ goes to its readout level $V_{RD}$ and the gate potential $V_G$ represented by the following equation (4) is obtained:

$$\begin{aligned} V_G &= \frac{C_G}{C_G + C_J} \cdot V_{RD} + \left( -\frac{C_G}{C_G + C_J} V_{RS} + \phi_B + \frac{Q_{Ph}(T_{INT1})}{C_G + C_J} \right) \\ &= \frac{C_G}{C_G + C_J}(V_{RD} - V_{RS}) + \phi_B + \frac{Q_{Ph}(T_{INT1})}{C_G + C_J} \end{aligned} \quad (4)$$

where the readout level $V_{RD}$ is selected so that the output signal represented by equation (6) which will be described later assumes a positive value or zero for $Q_{Ph} = 0$.

At this time, the potential $V_{GS}$ between the source and gate of the picture element SIT goes to $V_{GS} > V_P$ ($V_P$ is the gate-to-source potential difference beyond which a drain current starts to flow in the picture element SIT, namely, the pinchoff voltage). Thus, the drain current of the picture element SIT is allowed to flow and the floating capacitance of its associated source line 26-1, 26-2, ..., 26-n is charged. This charging continues until $V_{GS} = V_P$ is obtained. Accordingly, the source voltage $V_S$ is represented by the following equation (5):

$$V_S = \frac{C_G}{C_G + C_J}(V_{RD} - V_{RS}) + \phi_B + \frac{Q_{Ph}(T_{INT1})}{C_G + C_J} - V_P \quad (4)$$

Simultaneously, since the transfer pulse $\phi_T$ goes to its high level, the aforesaid source potentials $V_S$ of the picture elements SITs are transferred to the corresponding gates of the readout transistors 22-1, 22-2, ..., and 22-n through the transfer switches 21-1, 21-2, ..., 21-n, respectively.

When the scanning circuit 4 applies the selection pulses $\phi_{S1}, \phi_{S2}, \ldots, \phi_{Sn}$ to the respective picture-element selecting switches 23-1, 23-2, ..., 23-n, the picture-element selecting switches 23-1, 23-2, ..., 23-n are sequentially selected and switched on to perform sequential selection of the picture-element SITs. Each time one picture-element SIT is selected, an output signal $V_{OSi}$ which corresponds to the photoelectric charge $Q_{Phi}$ ($i = 1, \ldots, n$) stored in the selected picture-element SIT is transferred. In this fashion, the output signals $V_{OSi}$ are sequentially transferred from the respective picture-element SITs. The output signal $V_{OSi}$ is represented by the following equation (6):

$$V_{OSi} = a \cdot b \cdot \left( V_{Si} - \frac{V_T}{b} \right) \quad (6)$$

$(i = 1 \text{ to } n)$ where a ($<1$) represents the gain of the source follower constituted by the load resistor $R_L$ and the readout transistor 22-1, 22-2, ..., or 22-n, and b represents the efficiency of the transfer switch 21-1, 21-2, ..., or 21-n, $V_T$ represents the threshold voltage of the MOS transistor which constitute each of the source followers.

In such a readout operation, the source lines 26-1, 26-2, ..., 26-n of the respective picture-element SITs 20-1, 20-2, ..., 20-n and the gates of the respective readout transistors 22-1, 22-2, ..., 22-n are charged by the drain currents of the corresponding picture-element SITs 20-1, 20-2, ..., 20-n. Accordingly, the stored photoelectric charges in the gates of the picture-element SITs are held and thus non-destructive readout therefrom is performed. After completion of the readout operation, the transfer pulse $\phi_T$ and the reset pulse $\phi_R$ are simultaneously set to their high levels with the gate input signal $\phi_G$ held at its zero level. At this timing, none of the photoelectric charges stored in the gates of the picture-element SITs 20-1, 20-2, ..., 20-n are reset, but solely the source lines 26-1, 26-2, ..., 26-n and the readout transistors 22-1, 22-2, ..., 22-n are reset.

The sequence of output signals $V_{OS}$ thus obtained are subjected to A/D conversion and then input to the CPU 2, in which arithmetic operations for focus detection are executed to carry out focus detection. If an in-focus state is detected at this time, the lens is driven through the lens driving circuit 6 on the basis of the amount of defocusing obtained from the arithmetic operations.

If no in-focus state is detected in the above-described first readout process, the focus detecting operation proceeds to the second readout process which likewise comprises the steps of performing a readout operation, effecting A/D conversion and performing arithmetic operations for focus detection. The second readout is started at the time $T_{int2}$ that the gate input signal $\phi_G$ and the transfer pulse $\phi_T$ are set to the readout level $V_{RD}$ and the high level, respectively. Since the first readout has been performed in the non-destructive readout manner described above, the picture-element SITs 20-1, 20-2, ..., 20-n continue to store photoelectric charges in the course of the first readout. Accordingly, in the second readout, an integration period $T_{INT2}$ is equivalent in length to the period between the time of the start of the first integration and the time $T_{int2}$.

In the second readout period $T_{RD2}$, a readout is effected with respect to output signals corresponding to the photoelectric charges which have been stored during the second integration period $T_{INT2}$ in addition to those stored during the first integration period $T_{INT1}$. A focus detecting operation is effected on the basis of the output signals whose levels have increased in this manner. Subsequently, the above-described sequence of in-focus-state detecting operations is likewise repeated until an in-focus state is detected.

Figure 5:
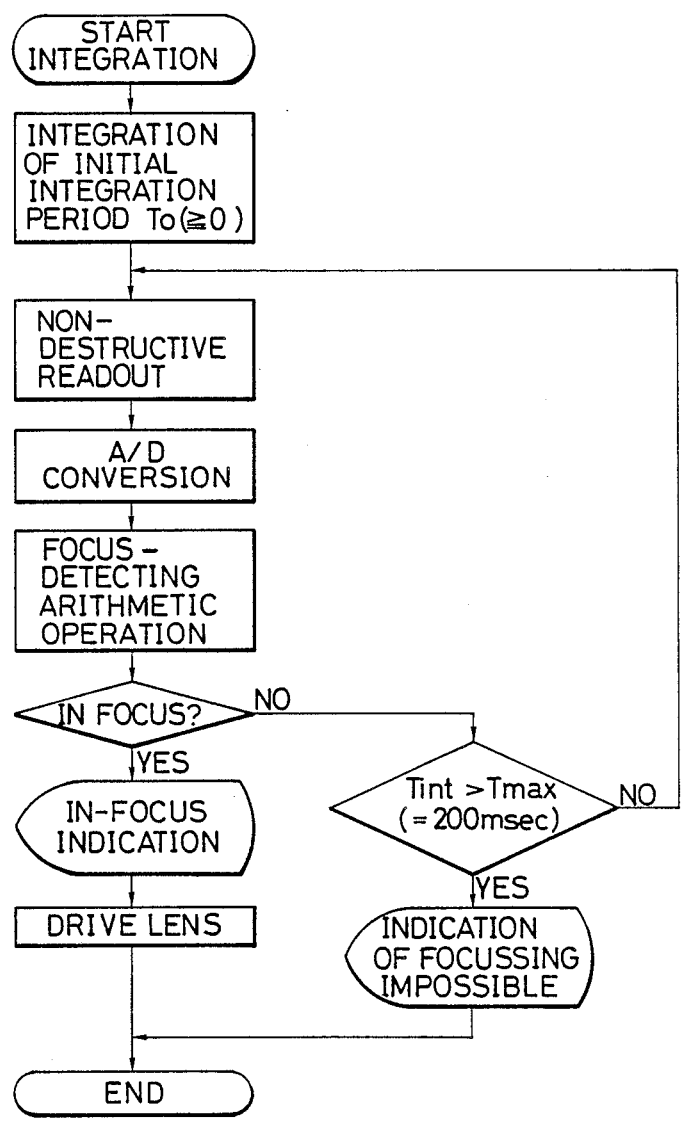
FIG. 5 is a flow chart showing one example of the algorithm of a focus detecting system according to the first embodiment.

FIG. 5 is a flow chart showing the algorithm of the above-described illustrative focus detecting operation according to the embodiment shown in FIGS. 1 and 2. In this illustrative focus detecting operation, when a predetermined initial integration period $T_0 (T_0 \geq 0)$ elapses after the start of integration for focus detection, the sequence of operations "non-destructive readout"—'-'A/D conversion"—"focus-detecting arithmetic operation"—"focus judgment" is repeated until an in-focus state is detected. Specifically, if a negative judgment is made in the focus judgment step, the process returns to the non-destructive readout step.

As the number of repetitions of this sequence of operations increases after the start of integration, the amount of charge stored in each picture-element SIT increases. When the amount of charge stored reaches the lowest signal level which can be used for focus detection, this lowest level being determined by the brightness, contrast, etc. of an object, detection of an in-focus state is started. When the in-focus state is detected, an in-focus indication is provided and, at the same time, the lens is driven by the resulting amount of defocusing.

It is to be noted that, since blurring may occur if the integration period $T_{int}$ is too long, it is desirable to set the upper limit $T_{max}$ of the integration period $T_{int}$ to, for example, 200 msec. If no in-focus state is detected even after the integration period $T_{int}$ has exceeded the upper limit $T_{max}$, an indication is provided which represents that focus detection is impossible.

In a conventional type of detecting system in which the integration period is determined by comparing a light-quantity monitor output with a predetermined reference value, the reference value is set at a fixed value in accordance with the dynamic range of its A/D converter and the saturation voltage of its photoelectric conversion device used, irrespective of the brightness, contrast, etc. of an individual object. Accordingly, it will be understood that the integration period obtained in such a conventional method is not an optimum integration period corresponding to various states of individual objects. The influence of this disadvantage is material when an object to be focused is of low brightness. More specifically, even if an object has low brightness but high contrast and therefore the integration period required for focus detection is relatively short, in the conventional method, integration will be continued until the monitor output reaches a predetermined reference value. As a result, an unnecessary portion may occur in the integration period. In contrast, the focus detecting system according to the present invention is a rational system in that it is arranged to continue integration only for the shortest possible period required to complete a focus detecting operation, as described above. Accordingly, it is possible to eliminate the unnecessary portion which would otherwise occur in the integration period.

Figure 6:
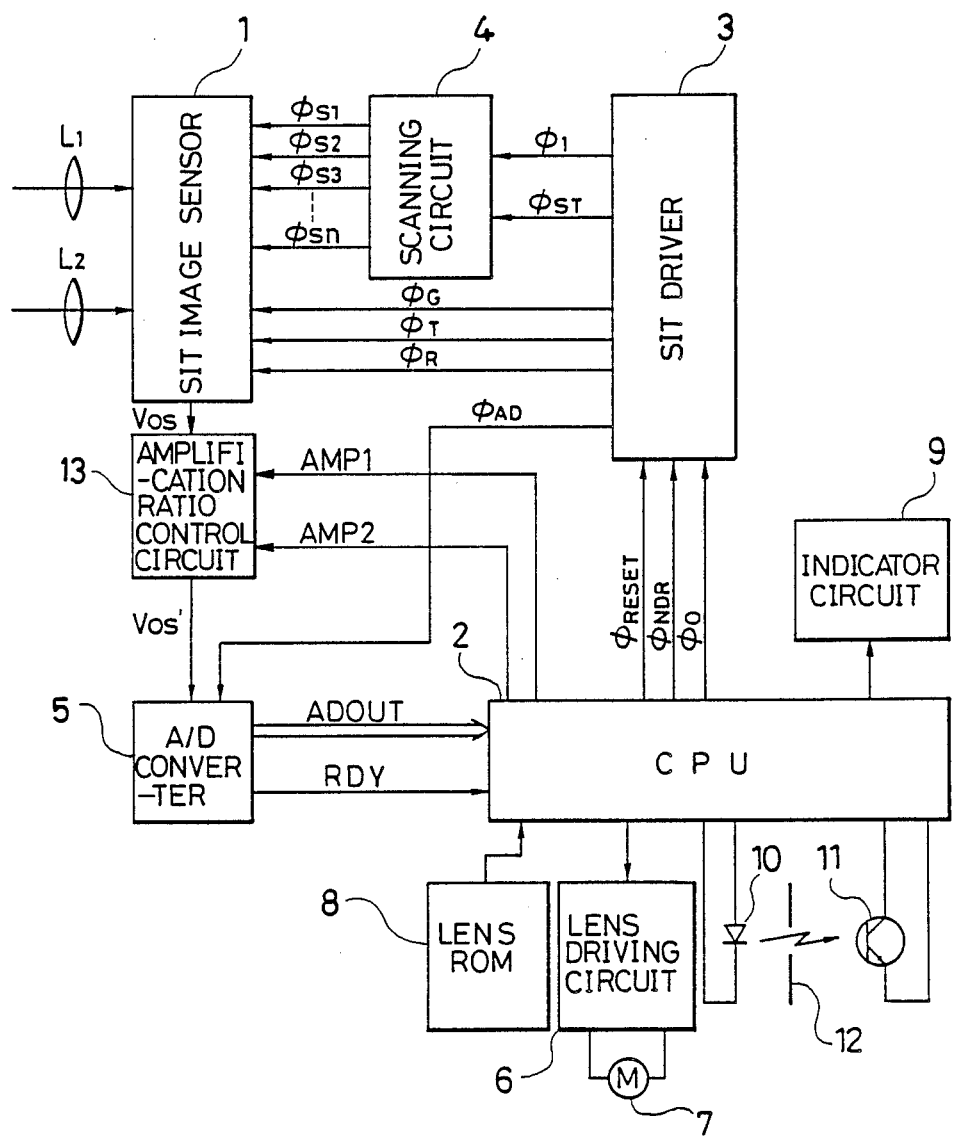
FIG. 6 is a block diagram showing a second embodiment of the present invention.

FIG. 6 is a block diagram showing a second embodiment of the focus detecting system according to the present invention. This embodiment includes, in addition to the constituent elements of the first embodiment, an amplification-ratio control circuit 13 for amplifying the output signal $V_{OS}$ of the SIT image sensor 1 in the case of focus detection as to a object of low brightness.

Figure 7:
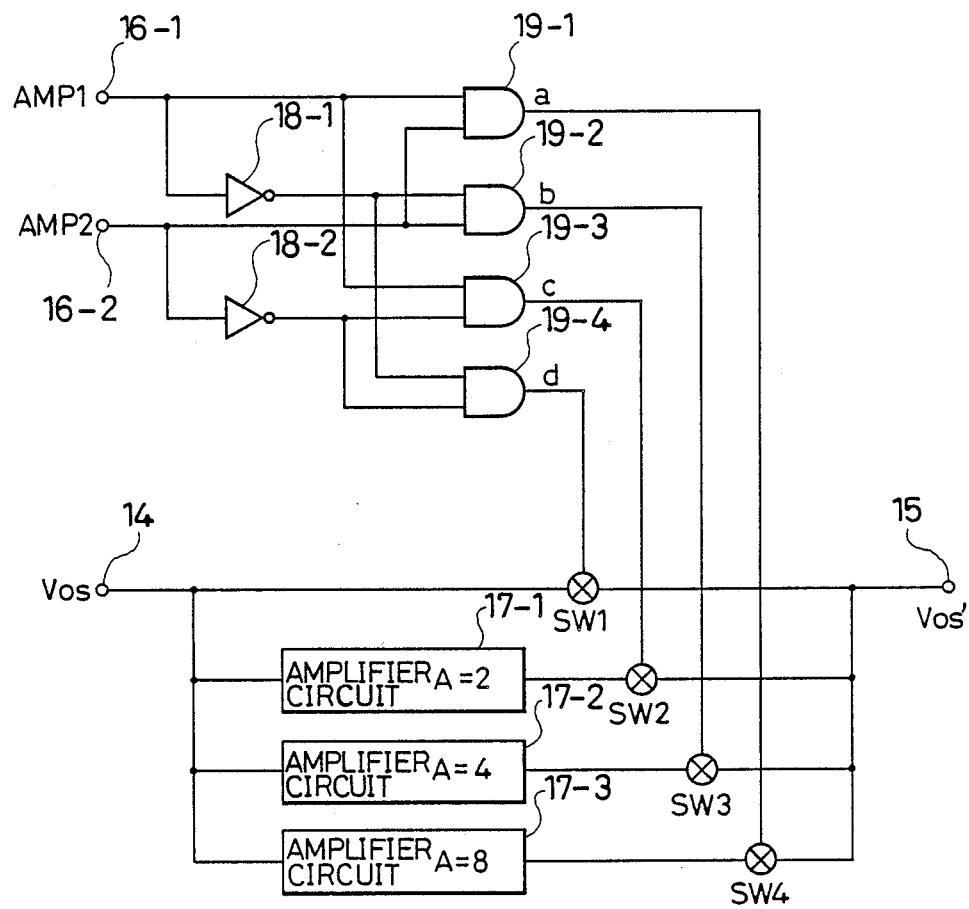
FIG. 7 is a block diagram showing an example of the construction of the amplification-ratio control circuit shown in FIG. 6.

As shown in FIG. 7, the amplification-ration control circuit 13 is provided with an input terminal 14 which receives the output signal $V_{OS}$ of the SIT image sensor 1, an output terminal 15 which is connected to the A/D converter 5, and input terminals 16-1 and 16-2 which receive amplification ratio control signals AMP1 and AMP2 from the CPU 2, respectively. Between the input terminal 14 and the output terminal 15, are connected a circuit composed of an analog switch SW1 alone, a circuit composed of an amplifier circuit 17-1 having an amplification ratio of 2 and an analog switch SW2, a circuit composed of an amplifier circuit 17-2 having an amplification ratio of 4 and an analog switch SW3, and a circuit composed of an amplifier circuit 17-3 having an amplification ratio of 8 and an analog switch SW4.

The input terminal 16-1 for the amplification-ratio control signal AMP1 is connected to one input terminal of each AND circuit 19-1 and 19-3 and through an inverter 18-1 to one input terminal of each AND circuit 19-2 and 19-4. The input terminal 16-2 for the amplification-ratio control signal AMP2 is connected to the other input terminal of each of the AND circuits 19-1 and 19-2 and through an inverter 18-2 to the other input terminal of each of the AND circuits 19-3 and 19-4. The analog switches SW1, SW2, SW3 and SW4 are arranged to be controlled by the outputs of the AND circuits 19-4, 19-3, 19-2 and 19-1, respectively.

If, in a low-brightness condition, no in-focus state can be detected even when a predetermined period (to be described later) has elapsed, the CPU 2 determines the amplification ratio in accordance with the level of the output signal of the SIT image sensor 1 and supplies the amplification-ratio control signals AMP1 and AMP2 to the amplification-ratio control circuit 13. The amplification-ratio control circuit 13 selects a predetermined analog switch in response to the amplification-ratio control signal AMP1 and AMP2, and the thus-selected amplifier circuit having the predetermined amplification ratio determined by the CPU 2 is inserted between the input terminal 14 and the output terminal 15. Thus, the output signal $V_{OS}$ of the SIT image sensor 1 is amplified at the predetermined amplification ratio and provided as an output signal $V_{OS}'$.

Table 1 shows the levels of signals provided at the output terminals a, b, c and d of the respective AND circuits 19-1, . . . , 19-4 as well as the corresponding amplification ratios of the amplification-ratio control circuit 13 with respect to each combination of the levels of the respective amplification-ratio control signals AMP1 and AMP2.

TABLE 1

| AMP1 | AMP2 | a | b | c | d | amplification ratio |
|---|---|---|---|---|---|---|
| H | H | H | L | L | L | 8 |
| L | H | L | H | L | L | 4 |
| H | L | L | L | H | L | 2 |
| L | L | L | L | L | H | 1 |

The focus detecting operation of the focus detecting system which is thus constructed is performed as follows. First, after the start of integration, a sequence of in-focus-state detecting operations is repeated which comprises the steps of performing non-destructive readout of the outputs of the picture-element SITs, effecting A/D conversion, and performing arithmetic operations for focus detection, thereby effecting focus detection. In this respect, the second embodiment is the same as the first embodiment. In the second embodiment, however, if the above sequence of in-focus-state detecting operations is repeated but, because of the low brightness of a object, an in-focus state is not detected even after the passage of the predetermined integration period $T_1$ which does not exceed the upper limit $T_{max}$, for example, 100 msec, the CPU 2 determines the amplification ratio of the output signal $V_{OS}$ of the SIT image sensor 1 in accordance with the level of the output signal $V_{OS}$ and then supplies the amplification-ratio control signals AMP1 and AMP2 to the amplification-ratio control circuit 13.

In the amplification-ratio control circuit 13, an amplifier circuit corresponding to the thus-determined amplification ratio is selected and the output signal $V_{OS}$ of the SIT image sensor 1 is amplified to provide the output signal $V_{OS}'$. Based on the amplified output signal $V_{OS}'$, the above-described focus detecting operation is repeated until an in-focus state is detected. In this case, if no in-focus state is detected even when the integration period has exceeded the upper limit $T_{max}$, it is determined that focus detection is impossible.

Figure 8:
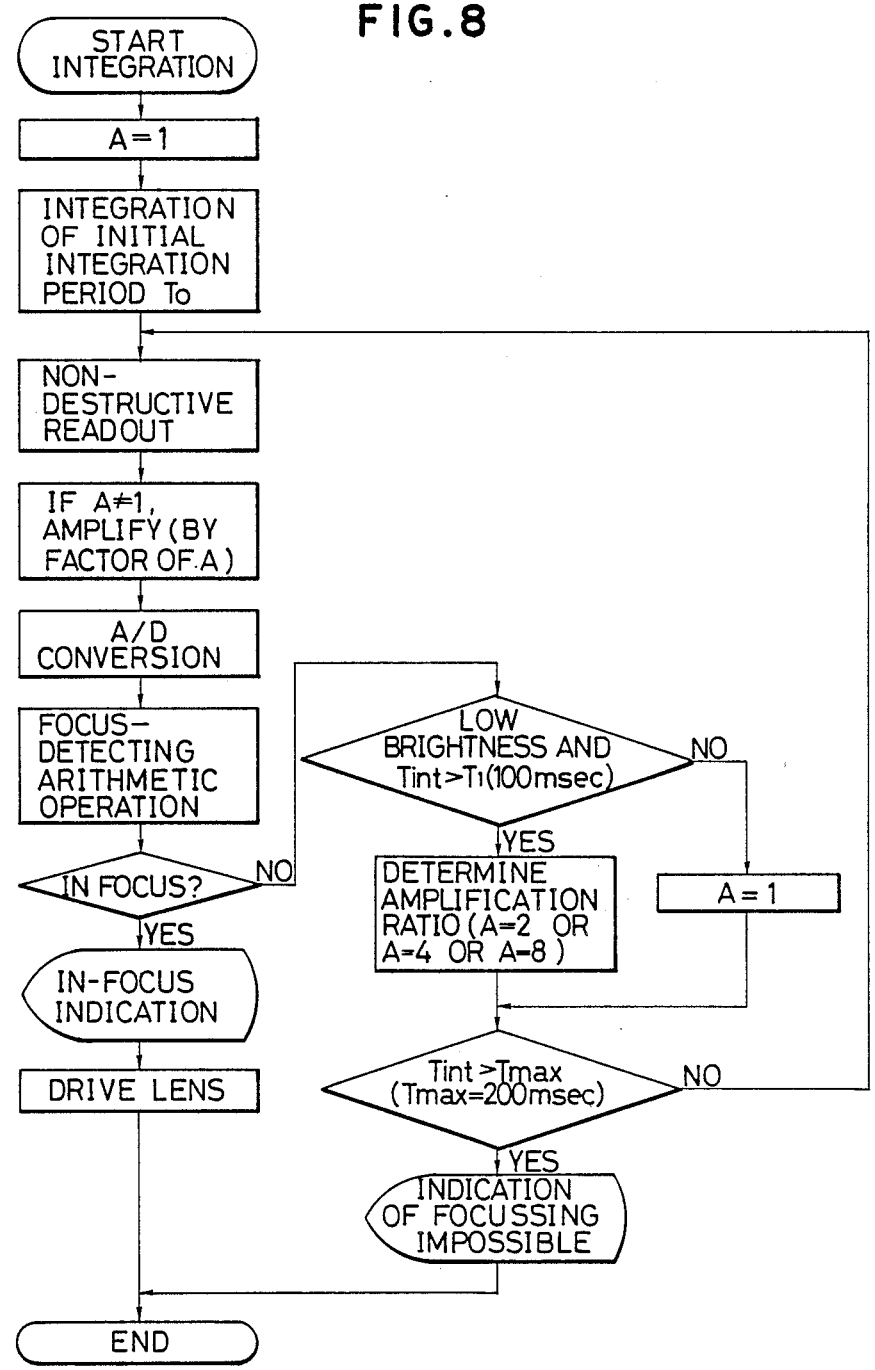
FIG. 8 is a flow chart showing one example of the algorithm of a focus detecting system according to the second embodiment.

FIG. 8 is a flow chart showing the algorithm of the above-described illustrative focus detecting operation according to the second embodiment. In this illustrative focus detecting operation, the amplification ratio of the amplification-ratio control circuit 13 is set to 1, and integration is started. When an initial integration period $T_0$ has passed, focus judgement is performed by executing non-destructive readout of the output of each picture-element SIT, A/D conversion of the non-amplified output, and arithmetic operations for focus detection. If it is determined that an in-focus state has been detected, an in-focus indication is provided and the lens is driven in accordance with the amount of defocusing.

When, in the first in-focus-state detecting operation, it is not determined whether or not an in-focus state has been detected, if the conditions are not satisfied in which the object is of low brightness and in which the integration period $T_{int}$ exceeds the predetermined period $T_1$ (100 msec), the above in-focus-state detecting operation is repeated with the amplification ratio set to 1 until the upper limit $T_{max}$ and until it is determined that the in-focus state has been detected.

On the other hand, when the conditions are satisfied in which the object is of low brightness and in which the integration period $T_{int}$ exceeds the predetermined period $T_1$, the CPU 2 determines a predetermined amplification ratio on the basis of the level of the output signal of the SIT image sensor 1 and the output signals obtained by the non-destructive readout are amplified at the predetermined amplification ratio. Subsequently, the above-described in-focus-state detecting operation is repeated until it is determined that an in-focus state has been detected. In either case, if no in-focus state is detected even after the integration period $T_{int}$ has exceeds the upper limit $T_{max}$, an indication is provided that focus detection is impossible.

In a case where focus detection is impossible, there are two primary causes: (1) It is impossible to make accurate focus judgment since the output signal level is sufficiently high but the contrast of an object is extremely low; and (2) it is impossible to make accurate focus judgement since the output signal level is low because of the low brightness of an object. In case (2), it is effective to amplify the output signal as described above but, if such amplification is performed in case (1), the amplitude of the output signal may exceed the dynamic range of the A/D converter. For this reason, CPU 2 is arranged to obtain the maximum value of the output signal levels of the picture-element SITs and, on the basis of the magnitude of the obtained maximum value, it is determined whether or not the brightness of the object is low and which of the amplification ratios should be selected. This decision is made together with focus judgement, and the maximum value of the output signal is obtained by comparing the first data with the second data to select the greater one as $V_{OSmax}$, then comparing the data $V_{OSmax}$ with the third data to again select the greater one as $V_{OSmax}$, and subsequently repeating the same operation until the nth data appears.

Figure 9:
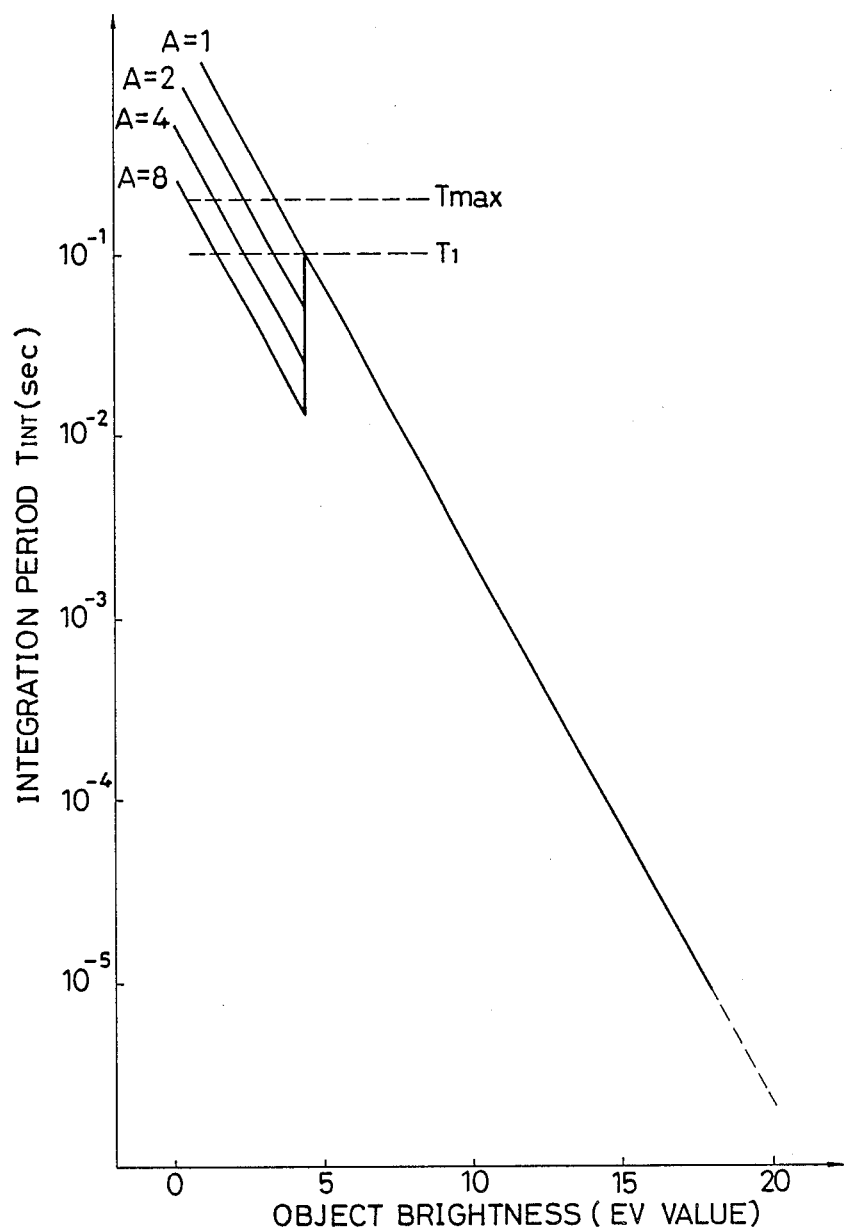
FIG. 9 is a graph showing one example of the relationship between the brightness of an object and a corresponding integration period.

FIG. 9 is a graph showing one example of the relationship between the brightness of an object and the integration period $T_{int}$. FIG. 9 illustrates the manner in which the brightness range of a object which allows a predetermined output signal level to be obtained before the integration period $T_{int}$ reaches the upper limit $T_{max}$ can be extended in its low-brightness range by three steps by effecting 2-fold, 4-fold, and 8-fold amplification of the output signal (500 mV in this example shown) of the picture-element SIT.

In a conventional type of focus detecting system which involves the amplification of an output signal, an amplification ratio is determined on the basis of a monitor output level and focus judgment is performed once. If no in-focus state is detected because of the low brightness of an object, the integration period is extended and integration is performed once more. In contrast, the second embodiment of the present invention adopts a non-destructive readout mode by making use of a photoelectric conversion element array from which non-destructive readout can be made. Accordingly, it is possible to eliminate an unnecessary repetition of integration, and the amplification ratio can be rationally set on the basis of, not the monitor output, but the output of the photoelectric conversion device serving as an image sensor.

Figure 10:
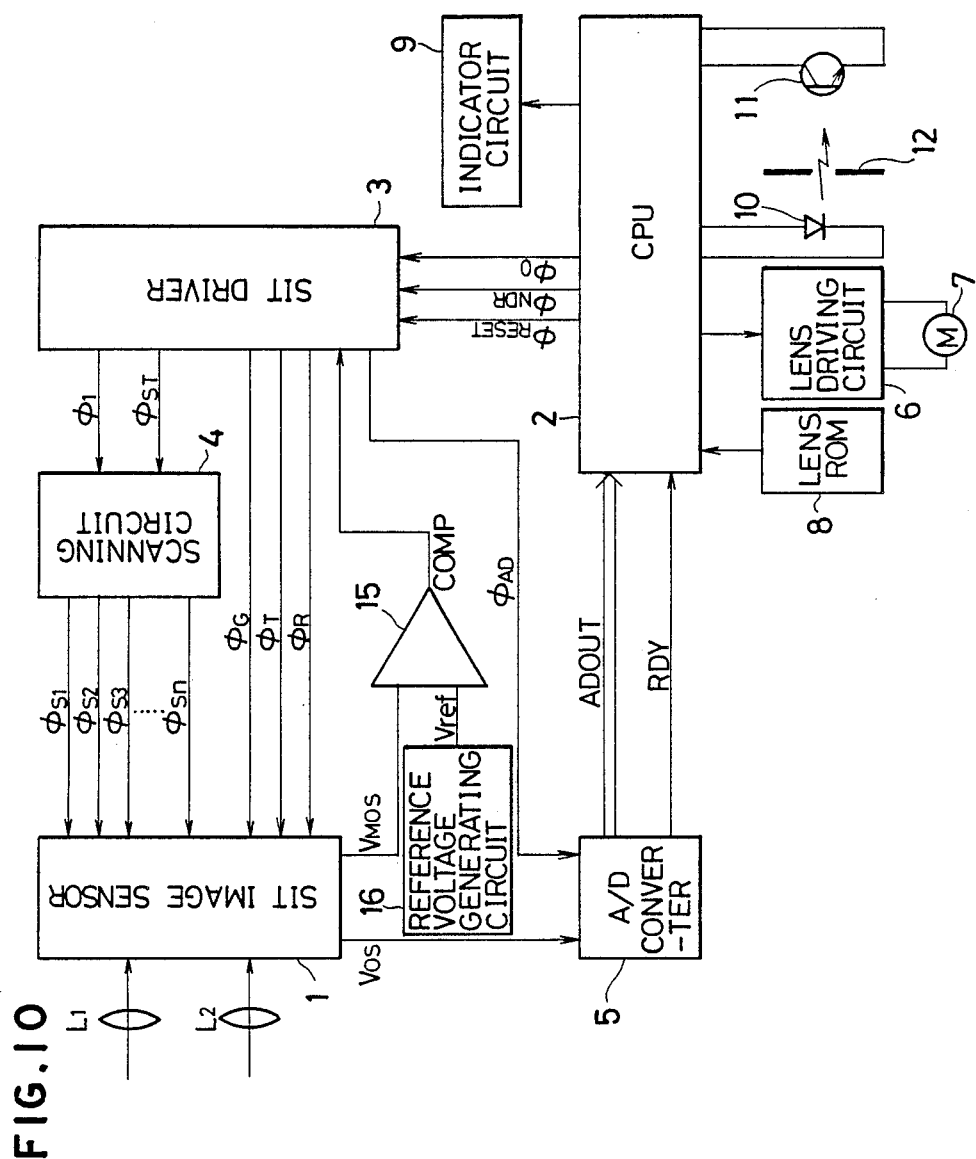
FIG. 10 is a block diagram showing the third embodiment of the present invention.

FIG. 10 is a block diagram showing a third embodiment of the present invention. In this figure, the same reference numerals are used to denote the same constituent elements as those in the first embodiment and the description thereof is omitted. In the third embodiment, the SIT image sensor 1 is adapted to supply the A/D converter 5 with the output signal $V_{OS}$ of an output circuit which corresponds to the charge stored in each of the picture-element SITs of the SIT image sensor 1, as well as to supply a comparator 15 with the output signal $V_{MOS}$ of a monitor circuit within the image sensor 1. The comparator 15 is arranged to compare a reference voltage $V_{ref}$ supplied from the reference-voltage generating circuit 16 and the aforesaid monitor output signal $V_{MOS}$ and then to supply the SIT driver circuit 3 with a comparison signal COMP which indicates the result of the comparison between the monitor output signal $V_{MOS}$ and the reference voltage $V_{ref}$.

The constructions of the SIT image sensor 1 having a line sensor composed of the picture-element SITs, as well as a readout circuit associated therewith will be described below with reference to FIG. 11.

Figure 11:
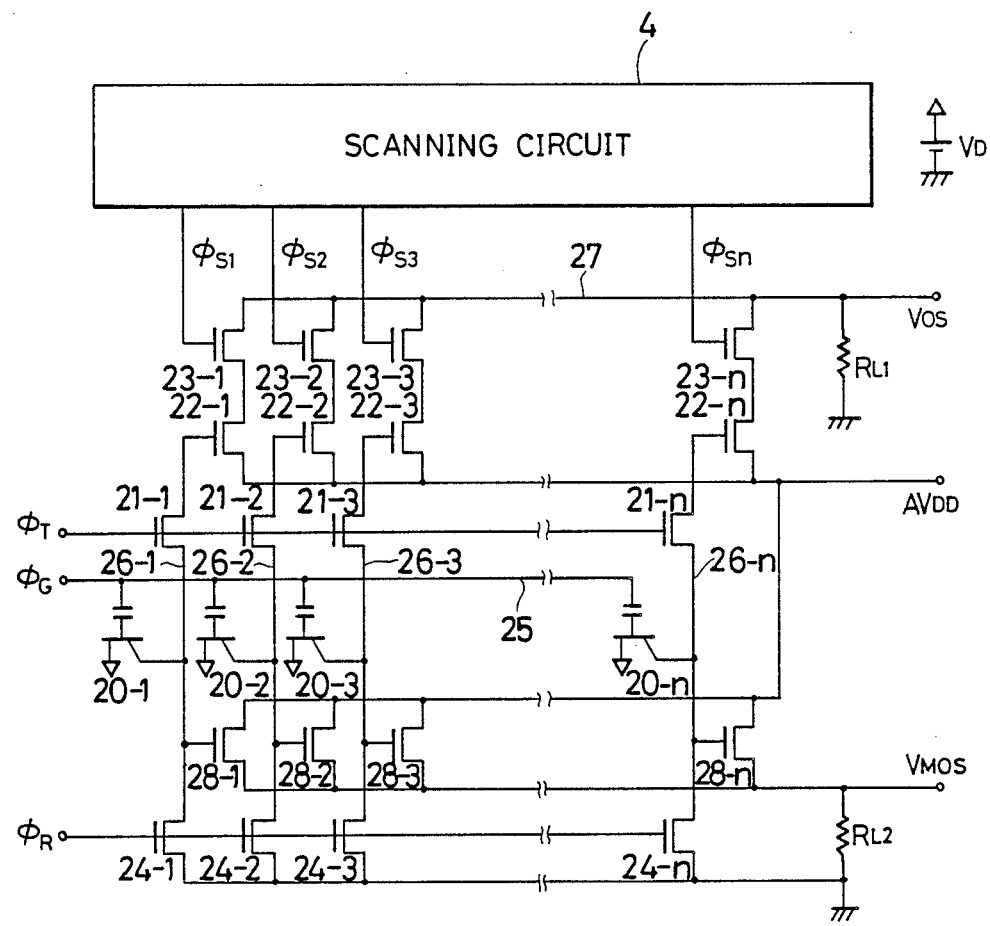
FIG. 11 is a circuit block showing the SIT image sensor in FIG. 10 and its associated readout circuit.

In FIG. 11, the same reference numerals are used to denote the same constituent elements in the first embodiment shown in FIG. 2, and the following description will be made solely with respect to portions which differ from those of the first embodiment.

In the embodiment shown in FIG. 11, the SITs 20-1, 20-2, ..., 20-n which constitute the individual picture elements are of the depletion type (or normally-on type). The depletion-type SIT is an SIT of the type in which a drain current flows even when its gate potential is zero. This type of SIT has a configuration in which the space surrounded by the inner edge of its gate region is expanded. A plurality of depletion-type picture-element SITs themselves are used as monitors, and the source potentials of the respective picture-element SITs are applied to the gates of corresponding monitor-readout MOS transistors 28-1, 28-2, ..., 28-n for monitoring purposes. The sources of the monitor-readout MOS transistors 28-1, 28-2, ..., 28-n are connected in common, and are combined with a load resistor $R_{L2}$ to form a source follower circuit, thereby providing the monitor output signal $V_{MOS}$.

The focus detecting operation of the third embodiment shown in FIGS. 10 and 11 will be described below. First, the focus detecting operation when the monitor output signal reaches a reference value within a predetermined period will be described with reference to FIG. 12, which is a waveform diagram illustrating the timing of each signal.

Figure 12:
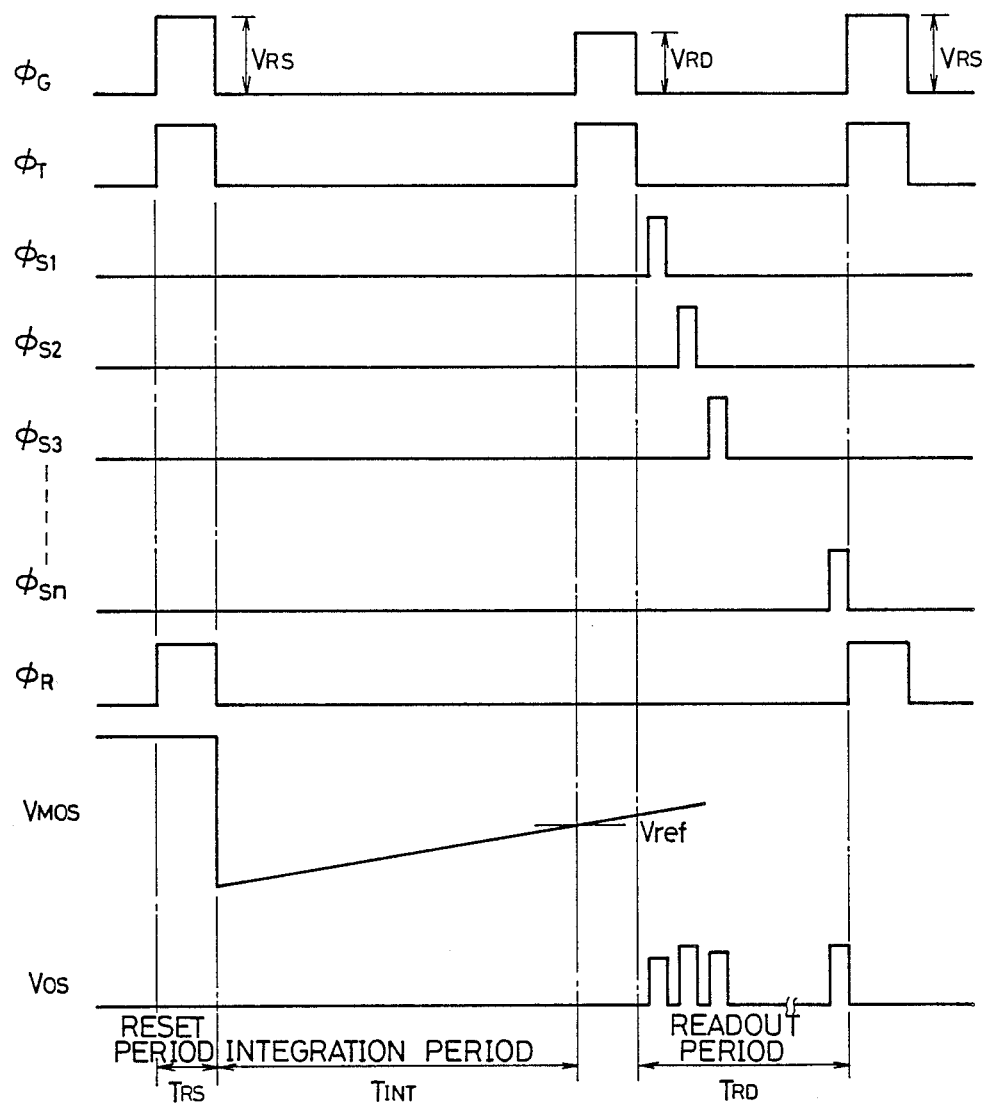
FIGS. 12 and 13 are circuit blocks respectively showing the operation of the third embodiment.

During the reset period $T_{RS}$ shown in FIG. 12, when the gate input signal $\phi_G$ goes to its reset level $V_{RS}$ ($V_{RS}>\phi_B$) and the reset pulse $\phi_R$ and the transfer pulse $\phi_T$ go to their high levels, the source potential $V_S$ of each of the picture-element SITs 20-1, 20-2, ..., 20-n is reset to ground potential and its gate potential $V_G$ goes to the level $\phi_B$.

When the integration period $T_{INT}$ is started after the completion of the reset period $T_{RS}$, the gate input signal $\phi_G$, the reset pulse $\phi_R$, and the transfer pulse $\phi_T$ go to the level of the ground potential. At this time, the gate potential $V_G$ is set to the reverse-biased state represented by the following equation (11), and light integration in each of the picture element SITs is started.

$$V_G = -\frac{C_G}{C_G + C_J} \cdot V_{RS} + \phi_B \quad (11)$$

The charge $Q_{Ph}$ generated by illumination with light during the light integration period $T_{INT}$ is stored in the gate capacitor ($C_G + C_J$), as represented by the following equation (12):

$$Q_{Ph} = G_L \cdot A \cdot P \cdot T_{INT} \quad (12)$$
$$= G_L \cdot A \cdot E$$

From equations (11) and (12), the gate voltage $V_G$ is represented by the following equation (13):

$$V_G = -\frac{C_G}{C_G + C_J} \cdot V_{RS} + \phi_B + \frac{Q_{Ph}}{C_G + C_J} \quad (13)$$

It is assumed here that each picture-element SIT is constituted by a normally-on type of SIT whose pinchoff voltage $V_P$ is negative and that the relationship between the pinchoff voltage $V_P$ and the gate voltage $V_G$ at the time of the start of light integration ($Q_{Ph}=0$) is set to $V_G \geq V_P$, drain currents starts to flow in the respective picture-elements SITs to thereby charge both the floating capacitances of the corresponding source lines 26-1, 26-2, ..., 26-n and the gate capacitances of the corresponding monitor-readout transistors 28-1, 28-2, ..., 28-n. This charging continues until the potential difference $V_{GS}$ between the gate and source of the picture-element SIT reaches $V_P$.

Accordingly, the source voltage $V_S$ is represented by the following equation (14):

$$V_G = -\frac{C_G}{C_G + C_J} \cdot V_{RS} + \phi_B + \frac{Q_{Ph}}{C_G + C_J} - |V_P| \quad (14)$$

Thus, if a' represents the gain of the source follower constituted by the monitor-readout transistor 28-1, 28-2, ..., or 28-n and the load resistor $R_{L2}$, the monitor outout signal $V_{MOS}$ represented by the following equation (15) is obtained:

$$V_{MOS}(T_{INT}) = a' \cdot V_S(T_{INT}) \quad (15)$$

$$V_G = a'\left(-\frac{C_G}{C_G + C_J} \cdot V_{RS} + \phi_B + \frac{Q_{Ph}(T_{INT})}{C_G + C_J} - |V_P|\right)$$

$$= a'\left(-\frac{C_L \cdot A \cdot P}{C_G + C_J} \cdot T_{INT} - \frac{C_G}{C_G + C_J} \cdot V_{RS} + \phi_B - |V_P|\right)$$

In this embodiment, the monitor output signal $V_{MOS}$ corresponds to a peak photometry which substantially depends upon the maximum one of the source potentials $V_S$ of the picture-element SITs.

The comparator 17 compares the monitor output signal $V_{MOS}$ and the reference voltage $V_{ref}$ generated by a reference-voltage generating circuit 16. When $V_{MOS}=V_{ref}$ is obtained, it is determined that the quantity of light has reached a level sufficient to execute detection of an in-focus state, and the outputs of the picture-element SITs are read out.

When the readout period $T_{RD}$ starts during which the picture-element SITs are read out, the gate input signal $\phi_G$ goes to its readout level $V_{RD}$, and the gate potential $V_G$ represented by the following equation (16) is obtained:

$$V_G = \frac{C_G}{C_G + C_J} \cdot V_{RD} + \left(-\frac{C_G}{C_G + C_J} \cdot V_{RS} + \phi_B + \frac{Q_{Ph}}{C_G + C_J}\right) \quad (16)$$

$$= \frac{C_G}{C_G + C_J}(V_{RD} - V_{RS}) + \phi_B + \frac{Q_{Ph}}{C_G + C_J}$$

The source voltage $V_S$ is represented by the following equation (17):

$$V_S = \frac{C_G}{C_G + C_J}(V_{RD} - V_{RS}) + \phi_B + \frac{Q_{Ph}}{C_G + C_J} - |V_P| \quad (17)$$

Simultaneously, since the transfer pulse $\phi_T$ goes to its high level, the aforesaid source potentials $V_S$ of the picture elements SITs are transferred to the gates of the corresponding readout transistors 22-1, 22-2, ..., and 22-n through the transfer switches 21-1, 21-2, ..., 21-n, respectively.

When the scanning circuit 4 applies the selection pulses $\phi_{S1}, \phi_{S2}, ..., \phi_{Sn}$ to the picture-element selecting switches 23-1, 23-2, ..., 23-n, the picture-element selecting switches 23-1, 23-2, ..., 23-n are sequentially selected and switched on to perform sequential selection of the picture-element SITs. Each time one picture-element SIT is selected, the output signal $V_{OS}$ which corresponds to the photoelectric charge $Q_{Phi}$ ($i=1, \ldots, n$) stored in the selected picture-element SIT is transferred. In this fashion, the output signals $V_{OS}$ are sequentially transferred from the picture-element SITs. The output signal $V_{OS}$ is represented by the following equation (18):

$$V_{OS} = a \cdot b \left\{ \frac{C_G}{C_G + C_J} (V_{RD} - V_{RS}) + \phi_B + \frac{Q_{Phi}}{C_G + C_J} - |V_P| - \frac{V_T}{b} \right\} \tag{18}$$

where a represents the gain of the source follower constituted by the load resistor $R_L$ and the readout transistor 22-1, 22-2, ..., or 22-n, and b represents the efficiency of the transfer switch 21-1, 21-2, ..., or 21-n, and $V_T$ represents the threshold voltage of the MOS transistor 22-1, 22-2, ..., or 22-n.

The sequence of output signals $V_{OS}$ thus obtained are subjected to A/D conversion and then input to the CPU 2, in which arithmetic operations for focus detection are executed to carry out focus detecting.

After the completion of the readout of the picture element SITs 20-1, 20-2, ..., 20-n, if the gate input signal $\phi_G$ is set to $\phi_G = V_{RS} (> \phi_B)$ and the reset pulse $\phi_R$ and the transfer pulse $\phi_T$ are set to their high levels, the charges stored in the source lines 26-1, 26-2, ..., 26-n and the gates of the respective picture-element SITs 20-1, 20-2, ..., 20-n are reset. In this case, if the reset pulse $\phi_R$ and the transfer pulse $\phi_T$ are set to the high levels with the gate input signal $\phi_G$ held at zero, none of the photoelectric charges stored in the gates of the picture-element SITs 20-1, 20-2, ..., 20-n are reset, but solely the source lines 26-1, 26-2, ..., 26-n and the readout transistors 22-1, 22-2, ..., 22-n are reset. Thus, the readout operation of the picture-element SITs is set in a non-destructive readout mode. This non-destructive readout mode is utilized for focus detection in the case of an object of low brightness, as will be described below.

In the above description, since an object is so bright that the monitor output signal $V_{MOS}$ reaches the reference voltage $V_{ref}$ within the predetermined period $T_1$ (for example, 50 msec), the integration period is set in accordance with this timing and the charges stored in the picture-element SITs are read out and, on the basis of the output signals, a focus detecting operation is performed. Next, a focus detecting operation when a object is relatively dark and the monitor output signal $V_{MOS}$ does not reach the reference voltage $V_{ref}$ within the predetermined period $T_1$ will be described with reference to the signal waveform diagram shown in FIG. 13.

If the monitor output signal $V_{MOS}$ does not reach the reference voltage $V_{ref}$ within the predetermined period (by time $T_1$ in this example), at time $T_1$, the gate input signal $\phi_G$ is set to its readout level $V_{RD}$ and the transfer pulse $\phi_T$ is set to its high level. Then, the scanning circuit 4 applies the selection pulses $\phi_{S1}, \phi_{S2}, \ldots, \phi_{Sn}$ to the picture-element selecting switches 23-1, 23-2, ..., 23-n, the output signal $V_{OS}$ corresponding to the charge stored in each of the picture-element SITs 20-1, 20-2, ..., 20-n is read out. Subsequently, the gate input signal $\phi_G$ is set to $\phi_G = 0$ and only the pulses $\phi_T$ and $\phi_R$ are set to their high levels. Thus, non-destructive readout is performed in which none of the charges stored in the picture-element SITs 20-1, 20-2, ..., 20-n are reset, while solely the source lines 26-1, 26-2, ..., 26-n and the transistors 22-1, 22-2, ..., 22-n are reset. The thus-obtained sequence of output signals $V_{OS}$ are subjected to A/D conversion and then input to the CPU 2, in which arithmetic operations for focus detection are performed to effect focus detection.

Figure 13:
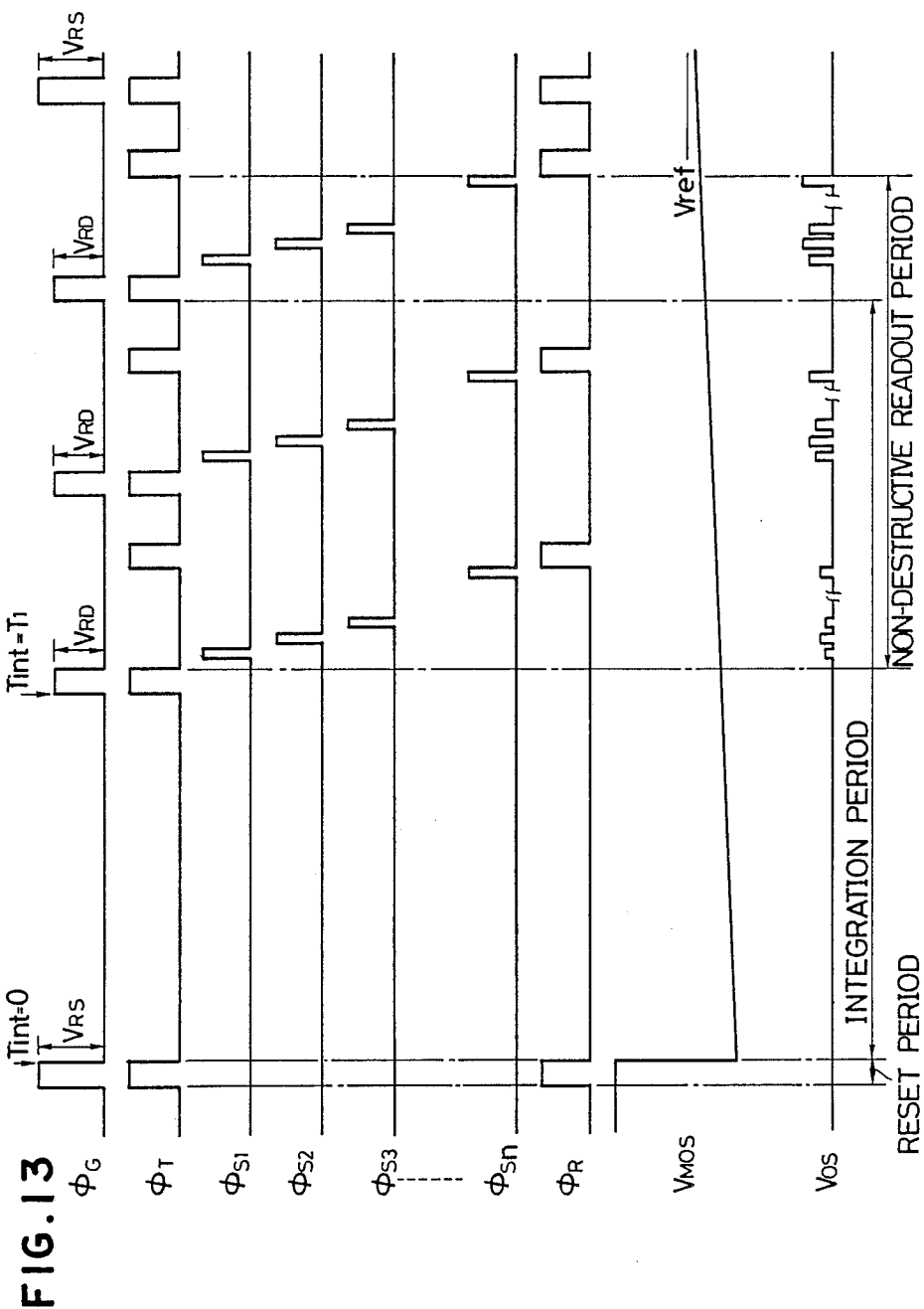

The above-described sequence of operations from the non-destructive readout to the focus detection is repeated until an in-focus state is detected. As the number of repetitions of the sequence of operations increases, the amount of charge stored in each of the picture-element SITs 20-1, 20-2, ..., 20-n increases. When the monitor output signal $V_{MOS}$ reaches the minimum signal level which can be used for focus detection, focus detection is carried out. At the same time that the focus detecting operation enters the next repetition process, the gate input signal $\phi_G$ which has been set to the reset level $V_{RS}$ is applied to the gate of each of the picture-element SITs 20-1, 20-2, ..., 20-n and thus all the picture element SITs 20-1, 20-2, ..., 20-n are reset. FIG. 13 shows an example in which after the above non-destructive readout has been repeated three times, an in-focus state is detected and the picture-element SITs are reset.

Figure 14:
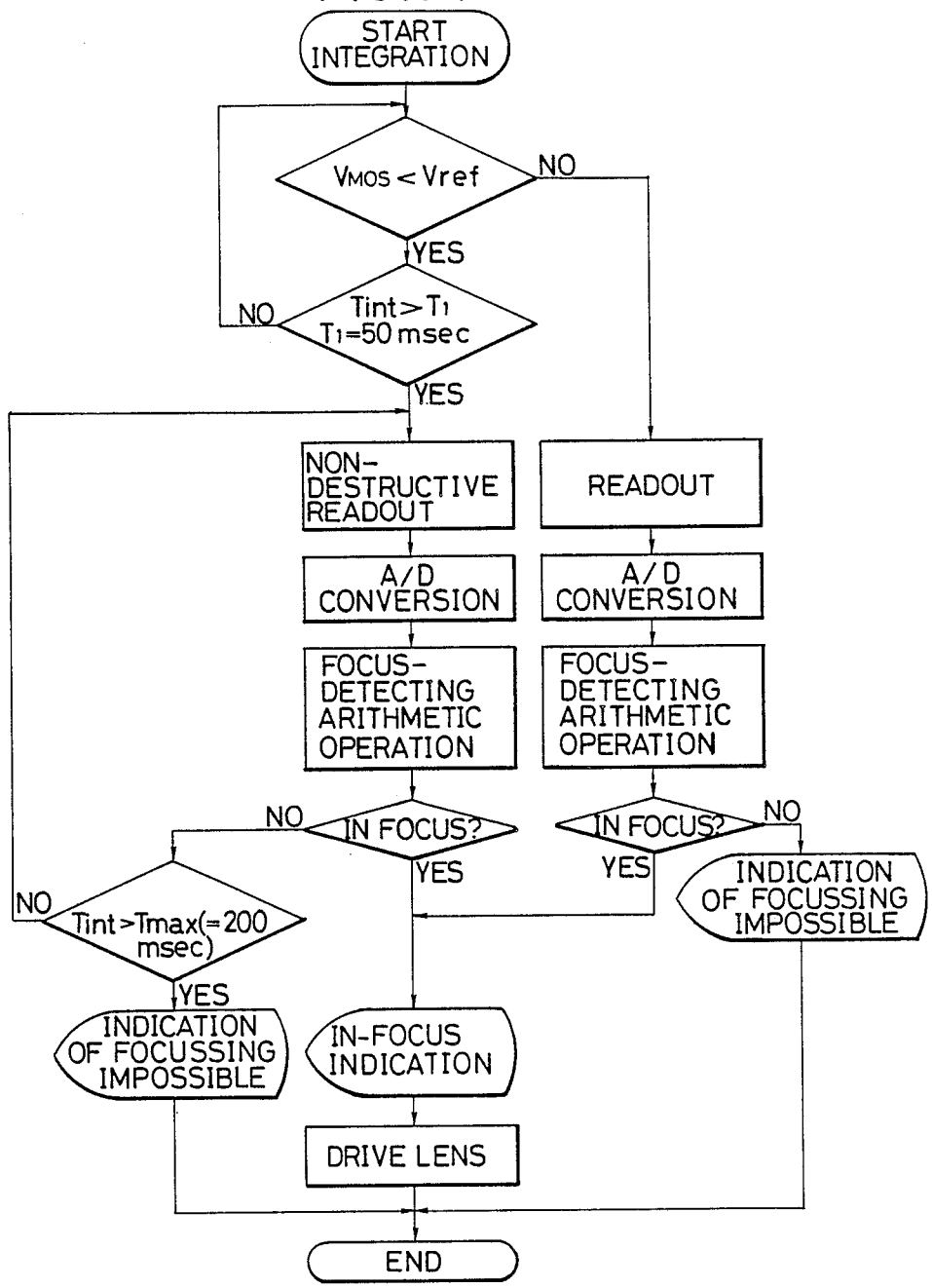
FIG. 14 is a flow chart showing one example of the algorithm of the focus detecting system according to the third embodiment.

FIG. 14 is a flow chart showing the algorithm of the illustrative focus detecting operation according to the third embodiment described above. In this illustrative focus detecting operation, during the period between the start of integration for focus detection and the time that the integration period $T_{int}$ reaches the predetermined period $T_1$ (for example, 50 msec), that is, in the period during which $T_{int} < T_1$, a readout operation is performed on the basis of the monitor output in a manner similar to that of the conventional focus detecting method. Specifically, if an object is bright and the monitor output signal $V_{MOS}$ becomes greater than the reference voltage $V_{ref}$ within the predetermined period $T_1$, the integration period is set with reference to the timing that the monitor output signal $V_{MOS}$ becomes greater than the reference voltage $V_{ref}$, and the readout of each picture-element SIT is performed. Subsequently, A/D conversion and arithmetic operations for focus detection are executed to perform focus judgement. If it is determined that an in-focus state has been detected, an in-focus indication is provided, and the lens (not shown) is driven in accordance with the amount of defocusing thus obtained. On the other hand, if no in-focus state is detected, an indication is provided that focus detection is impossible.

If an object is relatively dark and the monitor output signal $V_{MOS}$ does not reach the reference voltage $V_{ref}$ within the predetermined period $T_1$, after $T_{int} \geq T_1$ has been established, the sequence of operations "non-destructive readout"—"A/D conversion"—"focus-detecting arithmetic operation"—"focus judgment" is repeated until an in-focus state is detected. As the number of repetitions of this sequence of operations increases after the start of integration, the integration period $T_{int}$ is correspondingly extended and the amount of charge stored in each of the picture-element SITs increases. When the amount of charge stored reaches the lowest signal level which can be used for focus detection, this lowest level being determined by the brightness, contrast, etc. of the object, an in-focus state is detected and the lens is driven by the amount of defocusing which has been obtained at this time.

It is to be noted that, since blurring may occur if the integration period $T_{int}$ is too long, it is desirable to set the upper limit $T_{max}$ of the integration period $T_{int}$ to, for example, 200 msec. If no in-focus state is detected even after the integration period $T_{int}$ has exceeded the upper limit $T_{max}$, an indication is provided that focus detection is impossible.

In focus detecting systems of the conventional type employing a light-quantity monitor, the reference value $V_{ref}$ is set at a fixed value in accordance with the dynamic range of the A/D converter and the saturation voltage of the photoelectric conversion device, irrespective of the brightness, contrast, etc. of an object. Accordingly, it is not necessarily possible to obtain an optimum integration period according to various states of individual objects. The influence of this disadvantage is material when an object to be focused is of low brightness. More specifically, even if an object has low brightness but high contrast and therefore the focus thereof can be easily detected, the conventional method continues integration until the monitor output $V_{MOS}$ reaches the predetermined reference value $V_{ref}$. As a result, an unnecessary portion may occur in the integration period. In contrast, in the third embodiment of the present invention, it is possible to eliminate the unnecessary portion which would otherwise occur in the integration period. It is thus possible to prevent deterioration in response even when the brightness of an object is low.

Figure 15A:
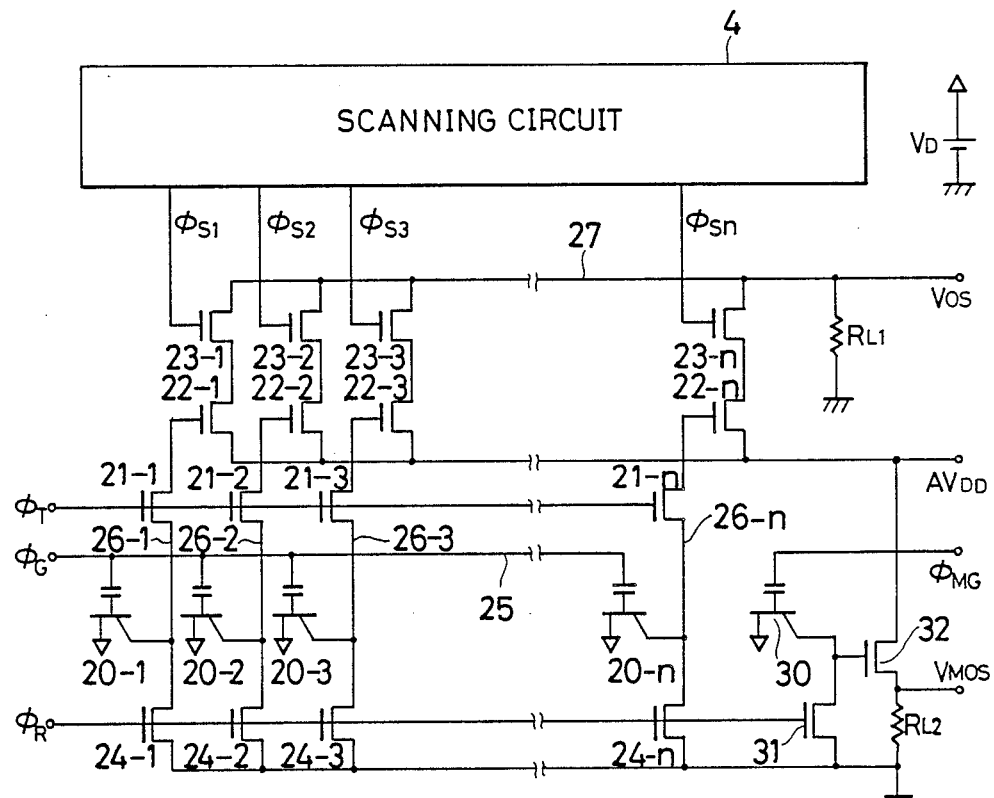
FIG. 15A is a circuit block showing an SIT image sensor and its associated readout circuit according to a fourth embodiment of the present invention.
Figure 15B:
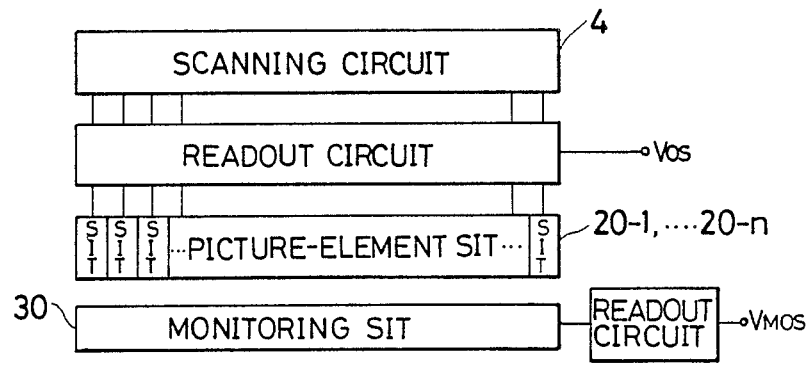
FIG. 15B is a schematic block diagram showing the image sensor of FIG. 15A and the associated readout circuits.

FIG. 15A is a block diagram showing the essential portion of a fourth embodiment of the focus detecting system according to the present invention, with FIG. 15B showing its construction in schematic block form. In FIG. 15A, the same reference numerals are used to denote the same constituent elements as those employed in the first embodiment and the description thereof is omitted.

The fourth embodiment is a modified version of the third embodiment shown in FIGS. 10 and 11 in that an SIT image sensor includes, in addition to the picture-element SITs, a single monitoring SIT disposed separately therefrom. In FIG. 15A, such a monitoring SIT is denoted by numeral 30, and a source-line reset transistor 31 is connected to the source of the monitoring SIT 30, and the reset pulse $\phi_R$ is applied in common to the reset transistors 24-1, 24-2, ..., 24-n and the gate of the monitoring SIT 30. The source of the monitoring SIT 30 is grounded. Reference numeral 32 denotes a MOS transistor for reading out the output of the monitoring SIT 30, and a source follower circuit is formed between the load resistor $R_{L2}$ and the monitor-output readout MOS transistor 32.

If the separate monitor SIT 30 is disposed, the pinch-off voltages $V_P$ of the picture-elements SITs 20-1, 20-2, ..., 20-n and the monitoring SIT 30 need not necessarily be at the same level. Accordingly, the operation of this embodiment will be described on the basis of the assumption that the monitoring SIT 30 is constituted by an SIT whose pinchoff voltage $V_P$ is approximately 0 V. The description of the operation of each of the picture-elements SITs 20-1, 20-2, ..., 20-n will be omitted since they operate in the same manner as those used in the third embodiment shown in FIG. 10, and the operation of the monitoring SIT 30 alone will be described below with reference to the signal waveform chart shown in FIG. 16.

Figure 16:
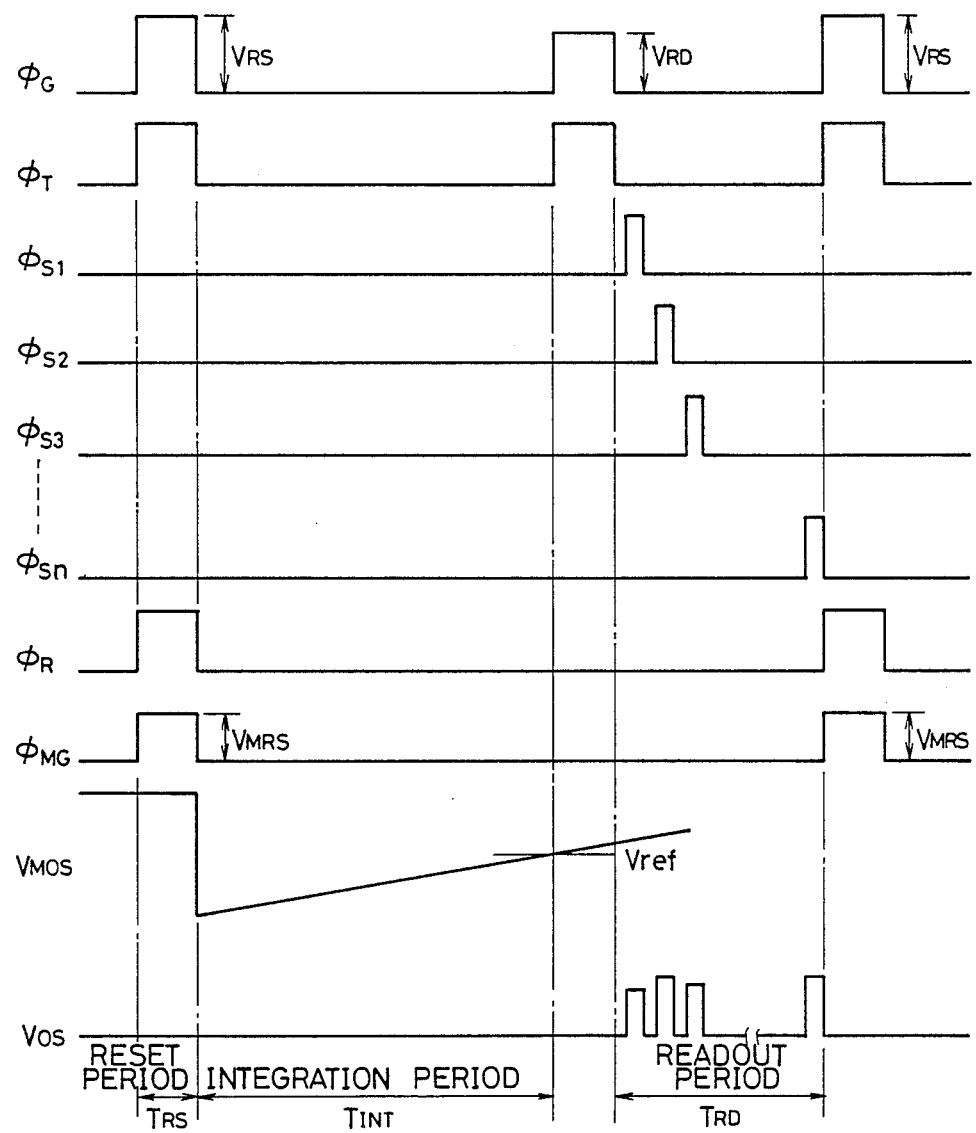
FIG. 16 is a signal waveform diagram which serves to illustrate the operation of the fourth embodiment.

During the reset period $T_{RS}$ shown in FIG. 16, when the gate input signal $\phi_{MG}$ of the monitoring SIT 30 goes to its reset level $V_{MRS}$ and the reset pulse $\phi_R$ and the transfer pulse $\phi_T$ go to their high levels, the source potential of the monitoring SIT 30 is reset to ground potential, while the gate potential of the same goes to the level $\phi_B$ which is the same as that of each of the picture-element SITs 20-1, 20-2, ..., 20-n.

When the integration period $T_{INT}$ is started after the completion of the reset period $T_{RS}$, the gate input signals $\phi_G$ and $\phi_{MG}$, the reset pulse $\phi_R$ and the transfer pulse $\phi_T$ go to the level of the ground potential and the gate potential $V_{MG}$ represented by the above equation (11) appears at the gate of the monitoring SIT 30. However, in order to obtain a monitor output signal corresponding to the charge $Q_{Ph}$ which has been generated since the integration was started, it is necessary to set the reset level $V_{MRS}$ so as to satisfy the following equation (19) for $T_{int}=0$:

$$V_{MG} = -\frac{C_G}{C_G + C_J} \cdot V_{MRS} + \phi_B \geq V_P \text{ (about 0 V)} \quad (19)$$

For instance, if $\phi_B$ is about 0.7 V, the reset level $V_{MRS}$ is set at 2.3 V for the case of $C_G/(C_G+C_J) \approx 0.3$.

By setting the reset level $V_{MRS}$ in this manner, the source-line capacitance and the gate capacitance of the readout MOS transistor 32 are charged by the drain current of the monitoring SIT 30, and the monitor output signal $V_{MOS}$ represented by the above equation (15) is obtained. Subsequently, as in the third embodiment, this monitor output signal $V_{MOS}$ is compared with the reference voltage $V_{ref}$ in a comparator (such as that shown in FIG. 10), and when $V_{MOS}=V_{ref}$ has been established, the output of each of the picture-element SITs is read out. On the basis of the obtained sequence of output signals, a focus detecting operation is performed. Also, the fourth embodiment is identical with the third embodiment in that if the level of the monitor output signal $V_{MOS}$ does not reach that of the reference voltage $V_{ref}$ within the predetermined time period $T_1$, the sequence of operations from the non-destructive readout operation to the in-state-focus detecting operation is repeated until an in-focus state is detected.

For the purpose of illustration, each of the above-described embodiments is arranged such that each time a non-destructive readout operation has been completed, the reset pulse $\phi_R$ is set to the high level and thus the readout circuit is reset. However, the present SIT image sensor may be arranged such that each time a non-destructive readout operation has been completed, the reset circuit is not necessarily reset. In this case as well, it is possible to repeatedly execute similar non-destructive readout of signal outputs.

Each of the above-described embodiments uses non-destructive readout type photoelectric conversion device constituted by SITs. However, a CMD (charge modulating device) type of image sensor may be substituted for such an SIT image sensor, the CMD being described in a collection of papers published in the International Electron Devices Meeting (IEDM) held in 1986, pages 353 to 356, the paper entitled "A NEW MOS IMAGE SENSOR OPERATING IN A NON-DESTRUCTIVE READOUT MODE". This CMD image sensor is constituted by picture elements each having an amplification function, and can be used in a non-destructive readout mode. Accordingly, the CMD image sensor can provide effects and advantages similar to those of the SIT image sensor described above.

What is claimed is:

1. A focus detecting system comprising:
   a non-destructive type photoelectric conversion element array constituted by a plurality of photoelectric conversion elements each of which allows an output corresponding to a photoelectric charge stored therein to be read out without destroying said stored photoelectric charge;
   A/D conversion means for converting an analog output of said photoelectric conversion element array into a corresponding digital value;
   focus-detecting arithmetic means for performing arithmetic operations upon a distance to an object to detect an in-focus-state based on said digital value output from said A/D conversion means; and
   lens driving means for driving a lens only when the in-focus-state is detected, said lens driven in accordance with object-distance information derived from said focus-detecting arithmetic means;
   wherein when a predetermined initial integration period $T_0$ ($T_0 \geq 0$) elapses after storage of said photoelectric charge has been started, a sequence of in-focus-state detecting operations is repeatedly executed so that focus detection occurs, said sequence of in-focus-state detecting operations comprising the steps of effecting non-destructive readout of the output of said photoelectric conversion element array, performing A/D conversion of said readout output, performing arithmetic operations for focus detection, and when the in-focus-state is detected, the in-focus-state detecting operations are terminated and said lens is driven to an in-focus position in accordance with the object-distance information obtained through said in-focus-state detecting operations.

2. A focus detecting system according to claim 1, wherein each of said photoelectric conversion elements which constitute said non-destructive type photoelectric conversion element array is selected between a static induction transistor and a charge modulation device.

3. A focus detecting system comprising:
   a non-destructive type photoelectric conversion element array constituted by a plurality of photoelectric conversion elements each of which allows an output corresponding to a photoelectric charge stored therein to be read out without destroying said stored photoelectric charge;
   variable amplification means for amplifying an analog output of said photoelectric conversion element array in accordance with a level of said output;
   A/D conversion means for converting an analog output of said variable amplification means into a corresponding digital value; and
   focus-detecting arithmetic means for performing arithmetic operations upon a distance to an object based on said digital value output from said A/D conversion means;
   wherein when a predetermined initial integration period $T_0$ ($T_0 \geq 0$) elapses after storage of said photoelectric charge has been started, a sequence of in-focus-state detecting operations is repeatedly executed so that focus detection occurs, said sequence of in-focus-state detecting operations comprising the steps of effecting non-destructive readout of the output of said photoelectric conversion element array, performing A/D conversion of said output is not amplified, and performing arithmetic operations for focus detection; and
   wherein if an object of low brightness and no in-focus state is detected even after a predetermined integration period $T_1$ ($T_1 > T_0$) has elapsed, the output of said photoelectric conversion element array is amplified in accordance with the level of said output and said sequence of in-focus-state detecting operations is repeatedly executed so that focus detection is effected.

4. A focus detecting system according to claim 3, wherein each of said photoelectric conversion elements which constitute said non-destructive type photoelectric conversion element array is selected between a static induction transistor and a charge modulation device.

5. A focus detecting system comprising:
   a non-destructive type photoelectric conversion element array constituted by a plurality of photoelectric conversion elements each of which allows an output corresponding to a photoelectric charge stored therein to be read out without destroying said stored photoelectric charge;
   monitoring means for monitoring an amount of charge stored in said photoelectric conversion element array;
   comparing means for comparing an output of said monitoring means with a reference value;
   A/D conversion means for converting an analog output of said photoelectric conversion element array into a corresponding digital value; and
   focus-detecting arithmetic means for performing arithmetic operations upon a distance to an object on said digital value output from said A/D conversion means;
   wherein when the monitor output level of said monitoring means reaches a predetermined value, which allows detection of an in-focus state, before a predetermined period elapses after storage of said photoelectric charge has been started, said output of said photoelectric conversion element array is read out so that focus detection is effected; and
   wherein if said monitor output level does not reach said predetermined value within said predetermined period, a sequence of in-focus-state detecting operations is repeatedly executed so that focus detection occurs, said sequence of in-focus-state detecting operations comprising the steps of performing non-destructive readout of said output of said non-destructive conversion element, effecting A/D conversion of said readout output and performing arithmetic operations for focus detection.

6. A focus detecting system according to claim 5, wherein said non-destructive photoelectric conversion element array itself is utilized as said monitoring means, the amount of charge stored in said non-destructive photoelectric conversion element array being monitored by means of a monitor-output readout MOS transistor array.

7. A focus detecting system according to claim 5, wherein said monitoring means is constituted by a photoelectric conversion device which is disposed separately from said non-destructive photoelectric conversion element array, the amount of charge stored in said photoelectric conversion device being monitored by means of a monitor-output readout MOS transistor.

8. A focus detecting system according to claim 5, wherein each of said photoelectric conversion elements which constitute said non-destructive type photoelectric conversion element array is selected between a static induction transistor and a charge modulation device.

9. A focus detecting system according to claim 6, wherein each of said photoelectric conversion elements which constitute said non-destructive type photoelectric conversion element array is selected between a static induction transistor and a charge modulation device.

10. A focus detecting system according to claim 7, wherein each of said photoelectric conversion elements which constitute said non-destructive type photoelectric conversion element array is selected between a static induction transistor and a charge modulation device.

* * * * *